US012180044B2

(12) United States Patent
Kasai

(10) Patent No.: US 12,180,044 B2
(45) Date of Patent: Dec. 31, 2024

(54) ROTATION LOCK DEVICE, LEVER HOIST, AND HOISTING MACHINE

(71) Applicant: KITO CORPORATION, Yamanashi (JP)

(72) Inventor: Takayuki Kasai, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 234 days.

(21) Appl. No.: 18/009,345

(22) PCT Filed: May 18, 2021

(86) PCT No.: PCT/JP2021/018865
§ 371 (c)(1),
(2) Date: Dec. 9, 2022

(87) PCT Pub. No.: WO2021/251077
PCT Pub. Date: Dec. 16, 2021

(65) Prior Publication Data

US 2023/0234816 A1 Jul. 27, 2023

(30) Foreign Application Priority Data

Jun. 9, 2020 (JP) ................................ 2020-100235
Nov. 30, 2020 (JP) ................................ 2020-198927

(51) Int. Cl.
*B66D 1/54* (2006.01)
*B66D 3/14* (2006.01)
*B66D 5/02* (2006.01)

(52) U.S. Cl.
CPC ................. *B66D 1/54* (2013.01); *B66D 3/14* (2013.01); *B66D 5/02* (2013.01)

(58) Field of Classification Search
CPC ... B66D 1/04; B66D 1/06; B66D 1/16; B66D 1/20; B66D 1/30; B66D 1/7452;
(Continued)

(56) References Cited

U.S. PATENT DOCUMENTS 2,878,910 A * 3/1959 Gunkel .................... B66D 3/16 192/15
4,512,555 A * 4/1985 Nakamura ............... B66D 3/14 254/350

(Continued)

FOREIGN PATENT DOCUMENTS

DE 102015121581 A1 6/2017
GB 749123 A * 5/1956

(Continued)

OTHER PUBLICATIONS

International Search Report and Written Opinion mailed on Aug. 3, 2021, received for PCT Application No. PCT/JP2021/018865, filed on May 18, 2021, 8 pages including English Translation.

*Primary Examiner* — Michael R Mansen
*Assistant Examiner* — Henrix Soto
(74) *Attorney, Agent, or Firm* — XSENSUS LLP

(57) ABSTRACT

A rotation lock device comprising: a stopper support member rotating integrally with a shaft-shaped member; a stopper member supported by the stopper support member in a state of being slidable; a holding means configured to hold the stopper member; an urging means configured to urge the holding means toward a first rotation direction with respect to the stopper member; and a stopper locking means configured to stop a rotation of the shaft-shaped member by engaging with the stopper member, wherein when the shaft-shaped member accelerates the rotation toward the first rotation direction, a holding force for the stopper member by the holding means is decreased and/or released by an inertial load of the holding means to cause the stopper member to project from the predetermined position to a position where the stopper member engages with the stopper locking means to thereby stop the rotation of the shaft-shaped member.

18 Claims, 23 Drawing Sheets

(58) Field of Classification Search

CPC .......... B66D 1/7468; B66D 1/54; B66D 1/58; B66D 3/02; B66D 3/10; B66D 3/12; B66D 3/14; B66D 3/16; B66D 5/02; B66D 5/04; B66D 5/12; B66D 5/1432; B66D 5/34; B66D 2700/05; B66D 2700/0116; F16D 63/006; F16D 1/108; F16D 2500/30408; B60R 22/36; B60R 22/38

USPC .......................................................... 212/272

See application file for complete search history.

(56) References Cited

U.S. PATENT DOCUMENTS

| | | | | |
|---|---|---|---|---|
| 4,582,179 | A * | 4/1986 | Nelson | B66D 5/06 185/39 |
| 5,351,937 | A | 10/1994 | Nishi et al. | |
| 5,398,912 | A * | 3/1995 | Nishi | B66D 3/14 254/352 |
| 5,570,872 | A | 11/1996 | Inoue et al. | |
| 6,224,039 | B1 * | 5/2001 | Okamoto | B66D 3/16 254/352 |
| 9,016,666 | B2 * | 4/2015 | Xia | B66D 3/12 254/273 |

FOREIGN PATENT DOCUMENTS

| | | | | |
|---|---|---|---|---|
| JP | 5-208798 | A | | 8/1993 |
| JP | 7-172779 | A | | 7/1995 |
| JP | 2000153993 | A | * | 6/2000 |
| JP | 2002-193591 | A | | 7/2002 |
| JP | 2008-230726 | A | | 10/2008 |
| KR | 100752317 | B1 | * | 8/2007 |

* cited by examiner

ROTATION LOCK DEVICE, LEVER HOIST, AND HOISTING MACHINE

CROSS-REFERENCE TO RELATED APPLICATIONS

This is a U.S. national stage of application No. PCT filing PCT/JP2021/018865, filed on May 18, 2021, priority under 35 U.S.C. § 119 (a) and 35 U.S.C. § 365 (b) is claimed from Japanese Patent Applications No. 2020-100235 filed on Jun. 9, 2020 and Japanese Patent Applications No. 2020-198927 filed on Nov. 30, 2020, the disclosure of each of which is also incorporated herein by reference.

TECHNICAL FIELD

The present invention relates to a rotation lock device, a lever hoist, and a hoisting machine.

BACKGROUND ART

For a work of lifting/lowing and drawing a cargo or fixing a cargo by a sling or the like (cargo tightening), a lever hoist is widely used. The lever hoist can perform hoisting (winding) and lowering (unwinding) of a chain by drive operation of an operation lever by a hand. An example of the lever hoist is the one disclosed in Patent Literature 1. In the lever hoist disclosed in Patent Literature 1, two centrifugal force members (31) and a housing ring (35) for housing the centrifugal force members (31) are provided on a side closer to an operation handle (12) than a frame (2B) of a pinion in addition to a conventional brake mechanism (mechanical brake). The centrifugal force members (31) are pressed against an inner peripheral surface of the housing ring (35) by the action of the centrifugal force. This decreases the falling speed of the cargo.

Note that the above brake mechanism (mechanical brake) is configured, for example, as illustrated in Patent Literature 2. The brake mechanism includes a pair of brake plates (10a, 10b), a reverse rotation preventing ratchet wheel (11), and a ratchet claw (12) attached to a claw shaft (15). Then, the ratchet claw (12) is urged by a spring (13), whereby the ratchet claw (12) is engaged with locking tooth (11a) of the ratchet wheel (11). The engagement prevents the reverse rotation of the ratchet wheel (11), whereby a drive shaft (4) can rotate in one direction, namely, only a hoisting direction.

CITATION LIST

Patent Literature

{PTL 1} DE 102015121581 A1
{PTL 2} JP 2008-230726 A

SUMMARY OF INVENTION

Technical Problem

Incidentally, when a mesh failure or damage between the locking tooth (11a) of the ratchet wheel (11) and the ratchet claw (12) as disclosed, for example, in Patent Literature 2 occurs in a brake mechanism (mechanical brake) having a ratchet mechanism including a ratchet wheel formed with many ratchet teeth at the outer periphery and a pawl member meshing with the ratchet tooth when hoisting hoists (the lever hoist and the chain block), the brake mechanism may stop functioning. When the brake stops functioning, a load sheave which winds the chain by the load of a suspended cargo may start to vigorously rotate in the lowering direction and fall the cargo.

Here, when the brake mechanism fails, the centrifugal force members (31) are pressed against the inner peripheral surface of the housing ring (35) by the action of the centrifugal force in the configuration disclosed in Patent Literature 1, thereby making it possible to decrease the falling speed of the cargo (namely, the rotation speed of the pinion). However, it is impossible to stop the fall of the cargo.

Further, the claw shaft (15) is attached to a frame (1b) by press fitting or the like in the configuration disclosed in Patent Literature 2. However, the thickness of the frame (1b) is relatively small, so that when the length of the claw shaft (15) is large, the moment acting on the claw shaft (15) becomes also large, and therefore it is necessary to increase the strength of the claw shaft (15) and its attachment portion according to the increase in moment, but when the claw shaft (15) is attached to a hole portion of the frame (1b) by press fitting, there is a limit in improvement in the attachment strength.

The present invention has been made in consideration of the above circumstances, and has an object to provide a rotation lock device, a lever hoist, and a hoisting machine which can surely stop the rotation of a shaft-shaped member when a brake device fails or the like and improve an attachment strength of a pawl shaft.

Solution to Problem

To solve the above problem, according to a first aspect of the present invention, there is provided a rotation lock device including: a stopper support member attached to a shaft-shaped member and rotating integrally with the shaft-shaped member; a stopper member supported by the stopper support member in a state of being slidable outward from an axial center side of the shaft-shaped member; a holding means configured to hold the stopper member at a predetermined position of the stopper support member; an urging means configured to urge the holding means toward a first rotation direction being one rotation direction with respect to the stopper member; and a stopper locking means configured to stop a rotation of the shaft-shaped member by engaging with the stopper member, wherein when the shaft-shaped member accelerates the rotation toward the first rotation direction, a holding force for the stopper member by the holding means is decreased and/or released by an inertial load of the holding means to cause the stopper member to project from the predetermined position to a position where the stopper member engages with the stopper locking means to thereby stop the rotation of the shaft-shaped member.

Further, in the above invention, it is preferable that: the holding means has a holding plate in a disk shape and a holding pin; the holding plate has a bearing hole pivotally supported to be rotatable around the axial center of the shaft-shaped member; and the stopper support member and the holding plate are coupled by the urging means.

Further, in the above invention, it is preferable that a side surface of the stopper member on a side opposite to a side surface in the first rotation direction is provided with a holding concave part engaging with the holding pin.

Further, in the above invention, it is preferable that the stopper locking means includes: an insertion hole configured to make the stopper support member rotatable around the axial center of the shaft-shaped member; a locking concave part which is concave from an inner wall of the insertion hole toward an outer diameter side and which the stopper member projecting from an outer periphery of the stopper support member enters; and a locking wall which is provided on an end portion side of the locking concave part in the first rotation direction and configured to stop the rotation of the shaft-shaped member by the stopper member coming into contact therewith.

Further, in the above invention, it is preferable that: the stopper locking means has an engagement release wall gradually projecting toward the axial center as going toward an end portion side of the locking concave part in a second rotation direction being an opposite direction to the first rotation direction; and the engagement release wall pushes back the stopper member from a projection position by rotating the shaft-shaped member in the second rotation direction in a state in which the stopper member is kept in contact therewith.

Further, in the above invention, it is preferable that: the holding means has a holding plate in a disk shape; the holding plate has a bearing hole pivotally supported to be rotatable around the axial center of the shaft-shaped member; the stopper support member and the holding plate are coupled by the urging means; the stopper member has a stopper projection projecting toward the holding plate; the holding plate has a holding projection part configured to engage with the stopper projection to hold the stopper member at a predetermined position in a radial direction of the stopper support member; and the holding projection part has a first regulation wall with which the stopper member engages at a predetermined position in the radial direction, and a second regulation wall with which the stopper member engages at a position where the stopper member projects to the outer diameter side from the predetermined position in the radial direction.

Further, in the above invention, it is preferable that: when the shaft-shaped member rotates with acceleration toward the first rotation direction, the holding means relatively rotates in a direction opposite to the first rotation with respect to the shaft-shaped member against an urging force of the urging means; and the holding means holds the stopper member at the predetermined position in the radial direction until an angle of the relative rotation exceeds a predetermined angle.

Further, in the above invention, it is preferable that the shaft-shaped member is integrally coupled to a load sheave around which a chain is wound.

Further, to solve the above problem, according to a second aspect of the present invention, there is provided a lever hoist including: a load sheave which is pivotally supported by a pair of frames and around which a chain configured to hoist a cargo is wound; a drive shaft coupled to the load sheave via a reduction gear; a brake device attached to the drive shaft; and an operation lever configured to perform a rotation drive operation on the load sheave in a hoisting direction and a lowering direction, wherein: on an outer periphery of the drive shaft, the rotation lock device according to each of the above inventions is arranged; the shaft-shaped member is the drive shaft; and the stopper locking means is attached to the frame.

Further, in the above invention, it is preferable that: in the rotation lock device, when the shaft-shaped member rotates with acceleration toward the first rotation direction, the holding means relatively rotates in the direction opposite to the first rotation with respect to the shaft-shaped member against the urging force of the urging means, and the holding means holds the stopper member at the predetermined position in the radial direction until the angle of the relative rotation exceeds the predetermined angle; the brake device includes a ratchet wheel having a plurality of ratchet teeth; the drive shaft includes the rotation lock device; and the predetermined angle is an angle obtained by dividing one circumference of the ratchet wheel by the number of ratchet teeth.

Further, to solve the above problem, according to a third aspect of the present invention, there is provided a hoisting machine having a frame in a plate shape, including: a brake device including a ratchet mechanism including: a ratchet wheel which is attached to a periphery of a shaft-shaped member and has a ratchet tooth on an outer peripheral side; a pawl member which engages with the ratchet tooth; and a pawl shaft which pivotally supports a turn of the pawl member, the ratchet mechanism being configured to allow a rotation in a hoisting direction of the ratchet wheel by engagement between the ratchet tooth and the pawl member and to disallow a rotation in a lowering direction; and a rotation lock device configured to lock a rapid rotation of the shaft-shaped member, the rotation lock device including: a stopper support member attached to the shaft-shaped member and rotating integrally with the shaft-shaped member; a stopper member supported by the stopper support member in a state of being slidable outward from an axial center side of the shaft-shaped member; a holding means configured to hold the stopper member at a predetermined position of the stopper support member; an urging means configured to urge the holding means toward the lowering direction with respect to the stopper member; and a stopper locking means configured to stop a rotation of the shaft-shaped member by contact with the stopper member; wherein when the shaft-shaped member accelerates the rotation toward the lowering direction, a holding force for the stopper member by the holding means is released by an inertial load of the holding means to cause the stopper member to project from the predetermined position to a position where the stopper member engages with the stopper locking means to thereby stop the rotation of the shaft-shaped member.

Further, in the above invention, it is preferable that: each stopper locking means is integrated with the pawl shaft; and the stopper locking means is attached to the frame via a fastening member.

Further, in the above invention, it is preferable that a pair of the stopper locking means are provided at positions different in a circumferential direction of the shaft-shaped member, and a space is provided between one of the stopper locking means and the other of the stopper locking means.

Further, in the above invention, it is preferable that: the holding means has a holding plate in a disk shape; the holding plate has a bearing hole pivotally supported to be rotatable around the axial center of the shaft-shaped member; the stopper support member and the holding plate are coupled by the urging means; the stopper member has a stopper projection projecting toward the holding plate; the holding plate has a guide groove configured to engage with the stopper projection to hold the stopper member at a predetermined position in a radial direction of the stopper support member; the guide groove has a first regulation wall with which the stopper member engages at a predetermined position in the radial direction, and a second regulation wall with which the stopper member engages at a position where the stopper member projects to the outer diameter side from the predetermined position in the radial direction; and the first regulation wall is formed of an arc coaxially with the bearing hole.

Further, in the above invention, it is preferable that: the holding plate is formed with a play gap groove part along a circumferential direction, and the stopper projection is movable along the play gap groove part; and the first regulation wall is a wall surface on an outer diameter side of the play gap groove part.

Further, in the above invention, it is preferable that: the stopper support member is provided with a stopper housing part in a concave shape which houses the stopper member, and the stopper member is housed in the stopper housing part when the stopper member does not project to the outer diameter side; an arc bottom surface in an arc shape is provided on a deep side of the stopper housing part being an inner diameter side of the shaft-shaped member; and an arc surface with an arc-shaped side surface of the stopper member engaging with the stopper housing part is provided on the inner diameter side of the shaft-shaped member.

Further, in the above invention, it is preferable that: when the shaft-shaped member rotates with acceleration toward the first rotation direction, the holding means relatively rotates in a direction opposite to the first rotation with respect to the shaft-shaped member against an urging force of the urging means; and the holding means holds the stopper member at the predetermined position in the radial direction until an angle of the relative rotation exceeds a predetermined angle.

Further, in the above invention, it is preferable that the hoisting machine is a lever hoist and includes: a load sheave which is pivotally supported by a pair of the frames and around which a chain configured to hoist a cargo is wound; a drive shaft coupled to the load sheave via a reduction gear and corresponding to the shaft-shaped member; and an operation lever configured to perform a rotation drive operation on the load sheave in a hoisting direction and a lowering direction.

Advantageous Effects of Invention

According to the present invention, it is possible to provide a hoisting machine which can surely stop the rotation of a shaft-shaped member when a brake device fails and improve an attachment strength of a pawl shaft.

DESCRIPTION OF EMBODIMENTS

First Embodiment

Figure 1:
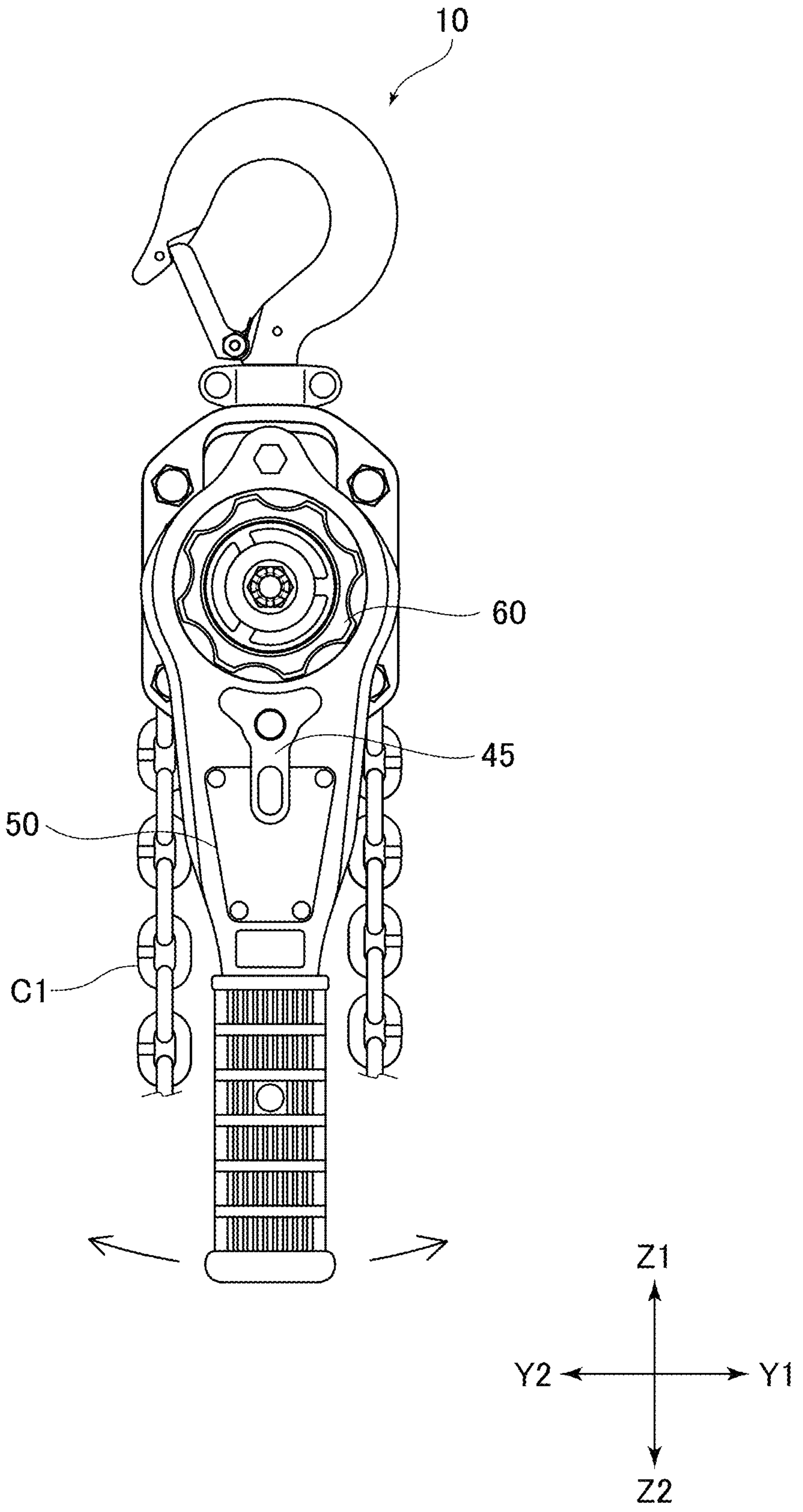
FIG. 1 is a front view illustrating an example of a configuration of a lever hoist to which a rotation lock (cargo fall prevention) device according to a first embodiment of the present invention is attached.

Hereinafter, a lever hoist 10 according to a first embodiment of the present invention will be explained based on the drawings. In the following explanation, an X-direction is an axial direction of a drive shaft 25, an X1 side is a side where an idling grip 60 is attached, and an X2 side is a gear box 34 side opposite thereto. Further, a Z-direction is a vertical direction (suspension direction; hoisting and lowering direction) in a suspension state of the lever hoist 10, a Z1 side is an upper side in the suspension state, and a Z2 side is a lower side in the suspension state. Further, a direction orthogonal to the X-direction and to the Z-direction is a Y-direction, a Y1 side is a right side in FIG. 4 and FIG. 5, and a Y2 side is a left side in FIG. 4 and FIG. 5. Further, in the following explanation, regarding a rotation direction of a load sheave 20, a lowering direction is one rotation direction, and a hoisting direction is the other rotation direction. Further, a rotation direction around a shaft coupled to the load sheave 20 is on the basis of a direction in which the load sheave 20 is rotated.

<Regarding the Overall Configuration of the Lever Hoist>

Figure 2:
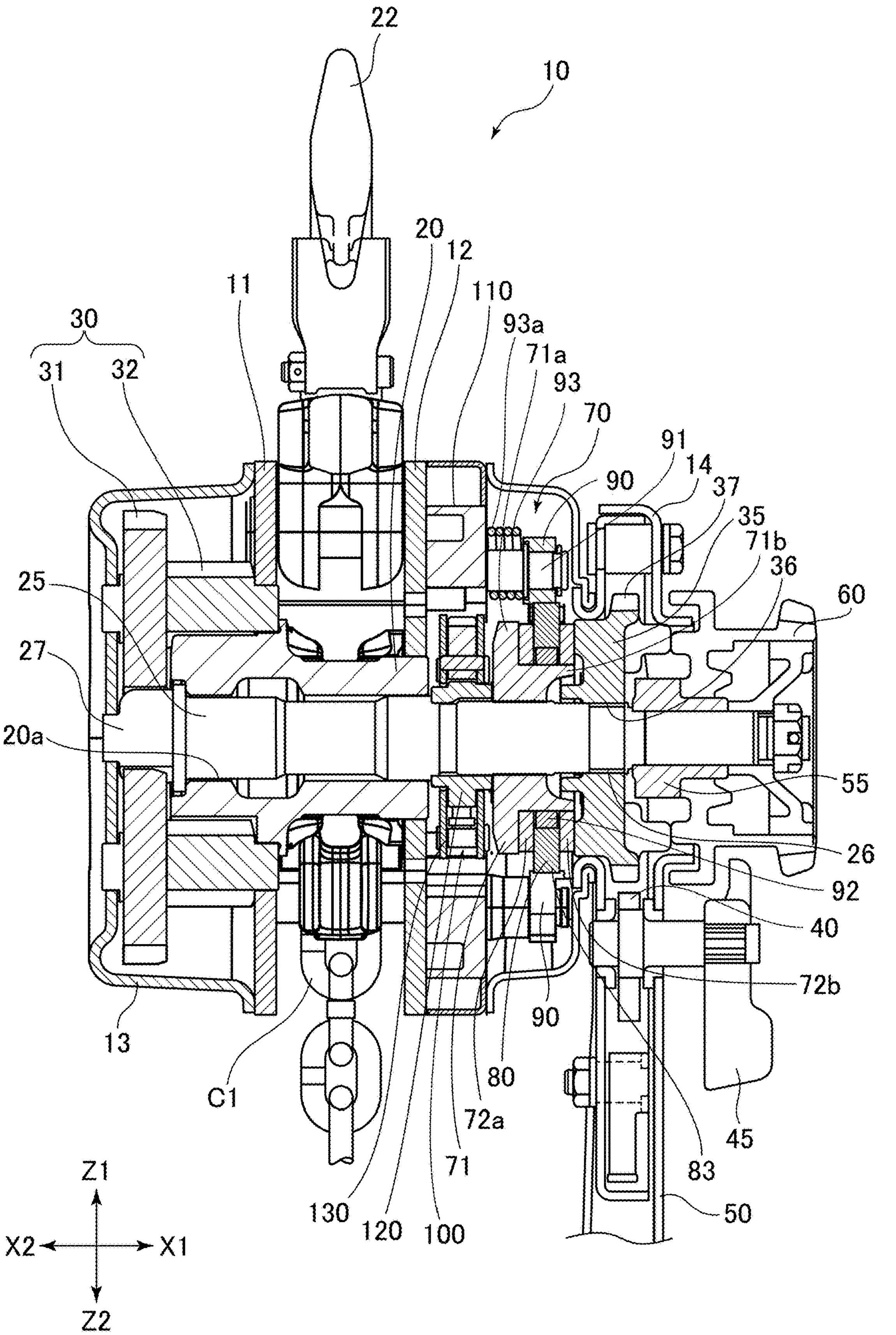
FIG. 2 is a cross-sectional view illustrating the configuration of the lever hoist illustrated in FIG. 1.

FIG. 1 is a front view illustrating an example of a configuration of the lever hoist 10 according to the first embodiment of the present invention. FIG. 2 is a cross-sectional view illustrating the configuration of the lever hoist 10 illustrated in FIG. 1.

As illustrated in FIG. 2, between a pair of frames 11, 12 included in the lever hoist 10, the load sheave 20 around which a chain C1 is wound is supported in a rotatable state. At the load sheave 20, a load gear 21 which meshes with a small-diameter gear part 32 of a later-explained reduction gear 30 is non-rotatably provided. Note that the details of the configuration of the load sheave 20 will be explained later.

Further, the load sheave 20 has an insertion hole 20*a* penetrating in the axial direction (X-direction), and the drive shaft 25 is inserted in a hollow hole of the load sheave 20. Note that the drive shaft 25 corresponds to a shaft-shaped member. A male screw part 26 which meshes with a female screw member 35 constituting a later-explained brake device 70 is provided on an outer peripheral side in the middle of the drive shaft 25, and a pinion gear 27 which meshes with a large-diameter gear part 31 of the reduction gear 30 is provided on the other side (X2 side) of the drive shaft 25. Further, the reduction gear 30 is also integrally provided with the small-diameter gear part 32 which meshes with the aforementioned load gear 21.

Note that a casing 13 is attached to the frame 11 to protect drive parts such as the aforementioned reduction gear 30, load gear 21 and so on. Further, the aforementioned male screw part 26 meshes with a female screw part 36 of the female screw member 35. The female screw member 35 is provided with a switching gear 37 capable of meshing with a switching claw 40 arranged at an operation lever 50 in addition to the female screw part 36. The switching claw 40 is, for example, a ratchet claw which is provided on each of one side and the other side, and the operation lever 50 is swung in a state in which the switching claw 40 meshes with the switching gear 37 to transmit driving force to the female screw member 35.

Further, a switching knob 45 is fixed coaxially with the switching claw 40, and a switching operation of the switching knob 45 can switch the transmission of a driving force to the female screw member 35 to a hoisting direction, a lowering direction, or a neutral position. For example, when the lower side (Z2 side) of the switching knob 45 is tilted to the left side in FIG. 1, the switching claw 40 for hoisting meshes with the switching gear 37. For this reason, when the operation of swinging the operation lever 50 is repeated, the switching gear 37 rotates in the hoisting direction but does not rotate in the lowering direction. This corresponds to a hoisting state of the chain C1.

On the other hand, for example, when the lower side (Z2 side) of the switching knob 45 is tilted to the right side in FIG. 1, the switching claw 40 for lowering meshes with the switching gear 37. For this reason, when the operation of swinging the operation lever 50 is repeated, the switching gear 37 rotates in the lowering direction but does not rotate in the hoisting direction. Further, when the switching knob 45 is switched to the neutral position, transition to an idle state is possible in which the chain C1 can be pulled out by a hand (the load sheave 20 and the drive shaft 25 also rotate in this event). Furthermore, it is also possible to perform hoisting or lowering of the chain C1 by the operation of the later-explained idling grip 60 without operating the operation lever 50.

Further, a cam member 55 is attached to the drive shaft 25 in a non-rotatable state, for example, spline coupling or key-coupling. Further, a member called the idling grip 60 is attached to the cam member 55 in a manner capable of sliding in the axial direction by a predetermined amount with respect to the cam member 55. The idling grip 60 at the position in FIG. 2 is non-rotatably engaged with respect to the cam member 55, but the idling grip 60 can rotate in a certain range with respect to the cam member 55 when the idling grip 60 is slid in the X1 direction. The idling grip 60 is a portion in an almost circular knob-shape capable of rotating together with the drive shaft 25 via the cam member 55, and can be gripped by a hand of an operator.

The idling grip 60 is coupled to the female screw member 35 by a not-illustrated first torsion spring, and is coupled to one end of the drive shaft 25 by a not-illustrated second torsion spring. When the idling grip 60 is slid in the X1 direction in FIG. 2 with the switching knob 45 being located at the neutral position, the idling grip 60 rotates in the lowering direction by a predetermined amount with an urging force of the second torsion spring (idle spring). The first torsion spring attached to the idling grip 60 rotated by the predetermined amount also rotates in the lowering direction to release the urging force that has rotation-urged the female screw member 35 in the hoisting direction until then, thereby changing into an idle mode. Here, when the operator grips the idling grip 60 by a hand and rotates it, the rotation force can be transmitted to the drive shaft 25 regardless of the idle mode or not. Accordingly, the rotation of the idling grip 60 enables quick adjustment of the length of the chain C1, and the slide of the idling grip 60 enables switching to the idle mode. Further, also in the idle mode, when a tension at a prescribed level or higher acts on the chain C1 in the lowering direction, the female screw member 35 relatively rotates in a tightening direction with respect to the drive shaft 25, whereby a brake of the later-explained brake device 70 works.

<Regarding the Brake Device 70>

As illustrated in FIG. 2, the brake device 70 is arranged at the drive shaft 25 coupled to the load sheave 20 via a gear. The brake device 70 has a brake receiver 71, brake plates 72*a*, 72*b*, a ratchet wheel 80, a pawl member 90, a pawl shaft 115, a bush 92, the female screw member 35 and so on as main components. Note that the ratchet wheel 80, the pawl member 90, and the pawl shaft 115 correspond to main components of a ratchet mechanism.

The brake receiver 71 has a flange part 71*a* and a hollow boss part 71*b*. The flange part 71*a* is a portion provided to be larger in diameter than the hollow boss part 71*b*, and can receive the brake plate 72*a*.

The hollow boss part 71*b* is located on a side closer to the female screw member 35 (X1 side) than the flange part 71*a*, and pivotally supports the ratchet wheel 80 via the bush 92. Note that the inner peripheral side of the hollow boss part 71*b* meshes with the drive shaft 25 by key-coupling, spline coupling, or the like, whereby the drive shaft 25 and the brake receiver 71 integrally rotate.

Further, the brake plates 72*a*, 72*b* are pivotally supported by the hollow boss part 71*b* between the flange part 71*a* and the ratchet wheel 80 and between the female screw member 35 and the ratchet wheel 80, respectively. The brake plates 72*a*, 72*b* are friction members made, for example, by forming a predetermined friction material into plate shapes, or arranged by sintering and molding the predetermined friction material on both surfaces of the ratchet wheel 80.

When the female screw member 35 is rotated in the hoisting direction, the female screw member 35 presses, together with the brake plates 72*a*, 72*b*, the ratchet wheel 80 in a direction of the brake receiver 71 by the action of the drive shaft 25 with the male screw part 26 to transmit the driving force to the drive shaft 25. On the other hand, even when the drive shaft 25 is rotated in the lowering direction in this state, the female screw member 35 presses, together with the brake plates 72*a*, 72*b*, the ratchet wheel 80 in the direction of the brake receiver 71. In this event, the ratchet wheel 80 is unable to rotate in the lowering direction by the pawl member 90, so that a brake force due to the frictional force acts on the brake device 70. This makes it possible to stop the rotation of the drive shaft 25 in the lowering direction. In contrast, when the female screw member 35 is turned in the lowering direction, the pressing force by the female screw member 35 is accordingly loosened to reduce the brake force of the brake device 70, thereby enabling the rotation in the lowering direction.

Further, a later-explained stopper support member 120 is integrally provided with the pawl shaft 115, and the pawl member 90 is turnably supported on the pawl shaft 115. Further, a coil part 93*a* of a torsion spring 93 is attached to the pawl shaft 115, and the torsion spring 93 applies an urging force in a direction in which the pawl member 90 is pressed against the ratchet tooth 83 of the ratchet wheel 80. As explained above, the ratchet wheel 80 is rotatable in the hoisting direction and is restricted in rotation in the lowering direction every pitch angle obtained by division by the number of teeth of the ratchet wheel 80. Note that a pair of pawl members 90 are provided and arranged separated by 180 degrees in the circumferential direction of the ratchet wheel 80.

<Regarding a Brake Cover 14 and a Lock Cover 15>

Figure 3:
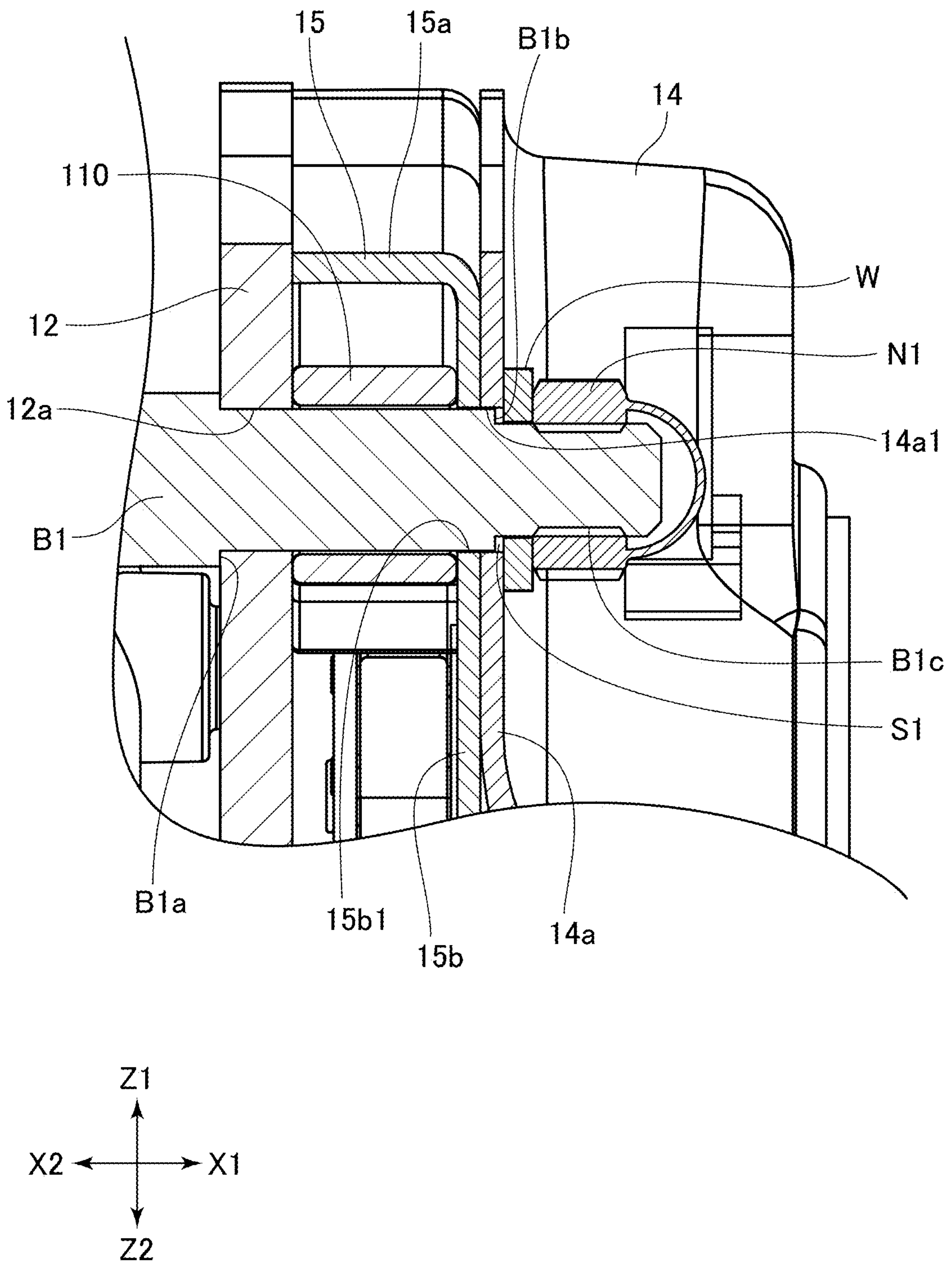
FIG. 3 is a partial enlarged cross-sectional view illustrating a configuration in the vicinity of a passage hole and an insertion hole into which a stay bolt is inserted of the lever hoist illustrated in FIG. 1.

As illustrated in FIG. 2 and FIG. 3, the brake cover 14 covers the above brake device 70 to prevent dust, rainwater and so on from entering a side of the brake device 70 existing inside the brake cover 14. The brake cover 14 is attached to the lock cover 15. In other words, a flange part 14*a* of the brake cover 14 is in contact with the lock cover 15 as illustrated in FIG. 3. Note that the flange part 14*a* is provided with an insertion hole 14*a*1, and a stay bolt B1 (corresponding to a tightening member) is inserted into the insertion hole 14*a*1.

Besides, the lock cover 15 is a cover which covers a later-explained rotation lock device 100. The lock cover 15 covers the rotation lock device 100 to prevent dust, rainwater and so on from entering the rotation lock device 100. The lock cover 15 has a rising part (side surface) 15*a* and an opposed surface 15*b* orthogonal to the rising part 15*a*. The opposed surface 15*b* is opposed to the flame 12 at a predetermined interval and is into contact with the flange part 14*a*.

Note that the thickness of a stopper locking member 110 (explained later) constituting the rotation lock device 100 and the height (inside dimension) of the rising part 15*a* from the opposed surface 15*b* are provided at the same level.

Further, the frame 12 is provided with a through hole 12*a* into which the stay bolt B1 is inserted. The stay bolt B1 inserted into the through hole 12*a* is provided to have a large diameter on the load sheave 20 side (X2 side), and the change in diameter of the stay bolt B1 provides a first step part B1*a* in the stay bolt B1. The first step part B1*a* comes into contact with the load sheave 20 side (X2 side) of the frame 12 to restrict the movement of the frame 12 to the load sheave 20 side (X2 side) (to position the frame 12). The stay bolt B1 is welded and joined to the frame 12 in the restricted state.

Further, the opposed surface 15*b* of the lock cover 15 is provided with a passage hole 15*b*1, and the stay bolt B1 is inserted into the passage hole 15*b*1. Further, the flange part 14*a* of the brake cover 14 is provided with the insertion hole 14*a*1, and the stay bolt B1 is inserted into the insertion hole 14*a*1. Here, the stay bolt B1 is provided with a second step part B1*b* similar to the above first step part B1*a*, and provided smaller in diameter on the idling grip 60 side (X1 side) across the second step part B1*b*. Further, a male screw part B1*c* is provided at a part of the stay bolt B1 projecting out to the idling grip 60 side (X1 side) from the insertion hole 14*a*1. Therefore, a nut (cap nut) N1 is screwed into the male screw part B1*c* via a washer W, thereby tightening and fixing the brake cover 14 and the lock cover 15.

Here, the above second step part B1*b* is set to be located at a middle portion of the insertion hole 14*a*1. Thus, a gap S1 is provided between the second step part B1*b* and the surface of the flange part 14*a*. This brings about a state in which even if the nut N1 is screwed into the male screw part B1*c*, the second step part B1*b* does not protrude to the surface side of the flange part 14*a*.

Note that the thickness of the stopper locking member 110 (explained later) and the height (inside dimension) of the rising part 15*a* from the opposed surface 15*b* are provided at the same level as explained above, so that the stopper locking member 110 is firmly fixed sandwiched between the frame 12 and the opposed surface 15*b*, and the rising part 15*a* comes into firm contact at its tip side with the frame 12. However, the height (inside dimension) of the rising part 15*a* may be slightly larger than the thickness of the stopper locking member 110 (explained later). In this case, the opposed surface 15*b* slightly bends due to the tightening of the nut N1, whereby the rising part 15*a* comes into firm contact at its tip side with the frame 12 and the stopper locking member 110 is firmly fixed (held).

<Regarding the Load Sheave 20 and the Rotation Lock (Cargo Fall Prevention) Device 100>

Figure 4:
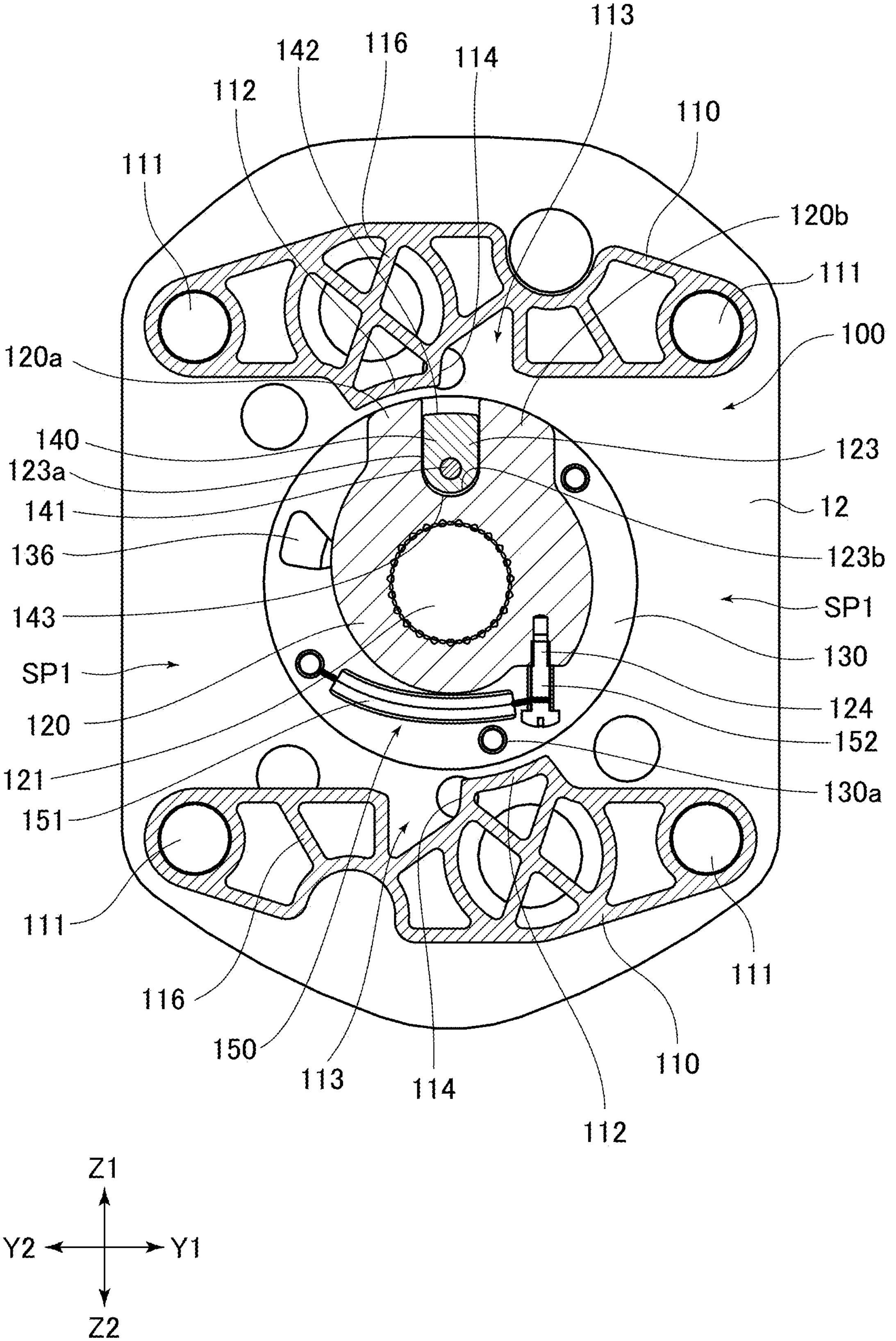
FIG. 4 is a cross-sectional view illustrating a configuration in the vicinity of the rotation lock (cargo fall prevention) device of the lever hoist illustrated in FIG. 1.
Figure 5:
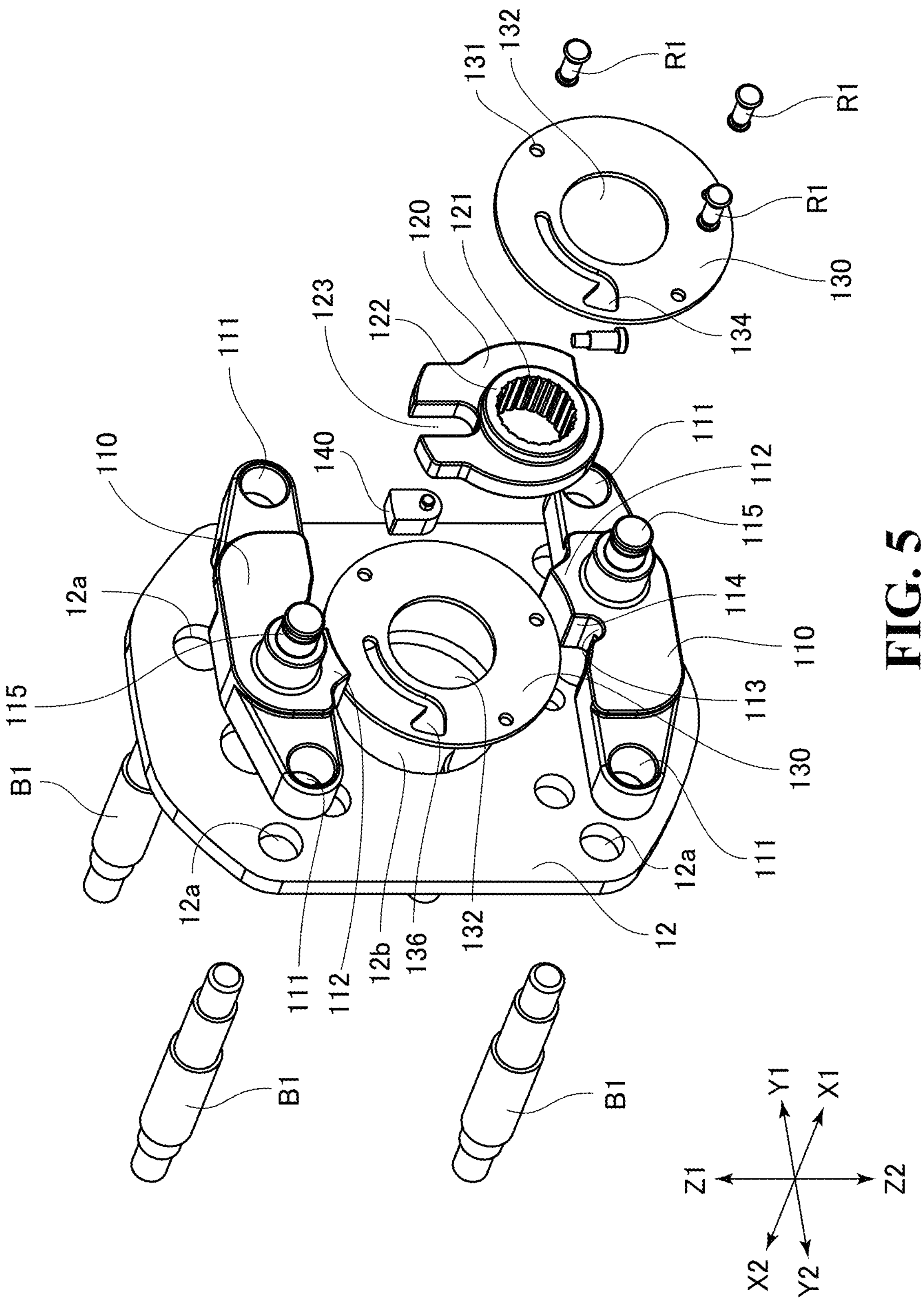
FIG. 5 is an exploded perspective view illustrating the configuration of the rotation lock (cargo fall prevention) device illustrated in FIG. 3.

Next, the load sheave 20 and the rotation lock (cargo fall prevention) device 100 will be explained. FIG. 4 is a cross-sectional view illustrating a configuration in the vicinity of the rotation lock (cargo fall prevention) device 100. FIG. 5 is an exploded perspective view illustrating the configuration of the rotation lock (cargo fall prevention) device 100 illustrated in FIG. 4. As illustrated in FIG. 4 and FIG. 5, the rotation lock (cargo fall prevention) device 100 has the stopper locking member 110, the stopper support member 120, a holding plate 130, the stopper member 140, an urging unit 150 as main components. Note that the stopper locking member 110 corresponds to a stopper locking means, and the urging unit 150 corresponds to an urging means.

As illustrated in FIG. 3 to FIG. 5, a pair of stopper locking members 110 are attached to the ratchet wheel 80 side of the frame 12 in this embodiment. The stopper locking member 110 is a member in a long piece shape long in the Y-direction in this embodiment, and a space SP1 is formed between the two stopper locking members 110. Therefore, the stopper locking member 110 can be reduced in weight as compared with the case where the stopper locking member is provided over the whole circumference on the outer peripheral side of the stopper support member 120 and the holding plate 130.

Each of the stopper locking members 110 is attached to the frame 12 via two stay bolts B1 and, for enabling such attachment, two attachment holes 111 are provided in the stopper locking member 110 and the stay bolts B1 are inserted into the attachment holes 111. Note that a pair of (two) attachment holes 111 are provided in this embodiment, but three or more attachment holes 111 may be provided.

Further, the stopper locking member 110 is provided with an inner protruding part 112. The inner protruding part 112 is a portion of the stopper locking member 110 which protrudes toward the center side of a shaft hole 12*b* of the frame 12. Note that the shaft hole 12*b* is a hole into which the above drive shaft 25 and load sheave 20 are inserted.

The inner protruding part 112 is opposed to the outer peripheral surfaces of the later-explained stopper support member 120 and holding plate 130 in a state of having a slight gap therebetween. This forms a configuration not hindering the rotation of the stopper support member 120 and the holding plate 130 which support the stopper member 140 at the holding position. Note that one inner protruding part 112 is provided for each of the stopper locking members 110 in this embodiment. Accordingly, two inner protruding parts 112 are provided at an interval of 180 degrees in the circumferential direction.

Further, the inner protruding part 112 is provided with a locking wall 114. The locking wall 114 is a wall surface on the other side in the rotation direction of the inner protruding part 112 (on a clockwise side of the inner protruding part 112 in FIG. 4 and FIG. 5), and the stopper member 140 rotating in one rotation direction (lowering direction) collides with the locking wall 114 when protruding to the outside in the radial direction from the stopper support member 120 to enable stop of the rotation of the load sheave 20. To this end, the locking wall 114 is set at an inclination angle at which the locking wall 114 does not push the later-explained stopper member 140 back in a rotation axial core direction with respect to the radial direction in the shaft hole 12*b*. Further, a side surface of the stopper member 140 also has a side surface at an inclination angle at which the stopper member 140 is not pushed back in the rotation axial core direction due to the collision with the locking wall 114. Note that as illustrated in FIG. 5, a recessed part 113 recessed toward a direction away from the rotation axial center direction (outer diameter side) is provided continuous to the locking wall 114. The recessed part 113 is engaged with not-illustrated one hook part of the torsion spring 93 so as to enable avoidance of the contact between the stopper member 140 and the hook part of the torsion spring 93.

Further, as illustrated in FIG. 5, the stopper locking member 110 is provided with the pawl shaft 115. In this embodiment, the pawl shaft 115 is integrated with the other portion of the stopper locking member 110. For the integration, the stopper locking member 110 is preferably formed by casting (for example, a lost-wax process). However, only the pawl shaft 115 may be separately formed, and the pawl shaft 115 may be attached by being press fitted into an attachment hole or the like existing at the stopper locking member 110.

Here, a plurality of ribs 116 are arranged inside the stopper locking member 110 as illustrated in the cross-sectional view in FIG. 4. More specifically, the stopper locking member 110 is not a solid member but a member in which a hollow portion composed of the plurality of ribs 116 exists, so that the stopper locking member 110 can be reduced in weight. Note that two ribs 116 are arranged to form an X on the base side of the pawl shaft 115 and thereby can receive the load of the pawl shaft 115 in the axial direction (thrust direction).

Note that a side wall of the inner protruding part 112 on the opposite side to the locking wall 114 may function as the locking wall 114 as illustrated in FIG. 4 in this embodiment. Further, a side wall on the clockwise side in FIG. 4 and FIG. 5 of the side wall facing the recessed part 113 may be configured to incline at a predetermined angle or more with respect to the radial direction and thereby make a later-explained stopper housing part 123 house the stopper member 140 protruding from the stopper housing part 123.

Next, the stopper support member 120 will be explained. The stopper support member 120 has a center hole 121 and is attached to the drive shaft 25 in the center hole 121, and the stopper support member 120 and the drive shaft 25 integrally rotate. Note that the attachment of the stopper support member 120 to the drive shaft 25 may be any kind of attachment such as a setscrew, key-coupling, spline coupling, or the like as long as it can transmit necessary torque.

Further, the stopper support member 120 is provided with a bearing boss part 122 as illustrated in FIG. 5. The bearing boss part 122 is a portion in a hollow shaft shape protruding in the axial direction (X-direction), and is fitted in a rotatable state into a center hole 132 provided in the holding plate 130.

Further, the stopper support member 120 is provided with the stopper housing part 123 directing from the center hole 121 side to the outer peripheral side. The stopper housing part 123 is a portion which houses the later-explained stopper member 140, and is opened on the outer peripheral side thereof. Accordingly, the stopper member 140 housed in the stopper housing part 123 can project toward the outer peripheral side, and is slidably supported by a side wall 123*a* of the stopper housing part 123.

Note that the stopper housing part 123 is formed by being sandwiched between a narrow piece part 120*a* and a wide piece part 120*b*. When the later-explained stopper member 140 collides with the locking wall 114, the narrow piece part 120*a* is located at a part opposed to the inner protruding part 112, whereas the wide piece part 120*b* is located at a part away from the inner protruding part 112 (locking wall 114) across the stopper housing part 123. In the configuration illustrated in FIG. 4, the narrow piece part 120*a* is located on the left side of the stopper housing part 123, and the wide piece part 120*b* is located on the right side of the stopper housing part 123. Here, the wide piece part 120*b* is provided to be wider in width in the circumferential direction than the narrow piece part 120*a*. Accordingly, even when the stopper member 140 collides with the locking wall 114, the strength enough to receive its impact by the wide piece part 120*b* is ensured.

Further, the stopper support member 120 is also provided with a plug-in hole 124. The plug-in hole 124 is a hole recessed from a part of the outer peripheral surface of the stopper support member 120 which does not interfere with the center hole 121 and the stopper housing part 123, and is formed from the outer peripheral surface on the side opposite to the stopper housing part 123 in FIG. 3. One end of a later-explained one-end hooking pin 152 is plugged into the plug-in hole 124, whereby the stopper support member 120 supports the one-end hooking pin 152.

Next, the holding plate 130 will be explained. Note that the holding plate 130 constitutes a holding means. The holding plate 130 is provided in a disk shape, and is provided with the center hole 132 at the center in its radial direction.

The bearing boss part 122 is fitted into the center hole 132, whereby the holding plate 130 is turnably supported coaxially with the stopper support member 120. Note that a distance from the rotation center to the outermost periphery (namely, radius) of the holding plate 130 is at the same level as that to the outermost periphery of the stopper support member 120. However, any one of the radii of the stopper support member 120 and the holding plate 130 may be provided to be larger.

In this embodiment, a pair of holding plates 130 are provided, and the stopper support member 120 is sandwiched between the pair of holding plates 130. In addition, the holding plates 130 are coupled at a predetermined interval by a coupling member R1.

Figure 6:
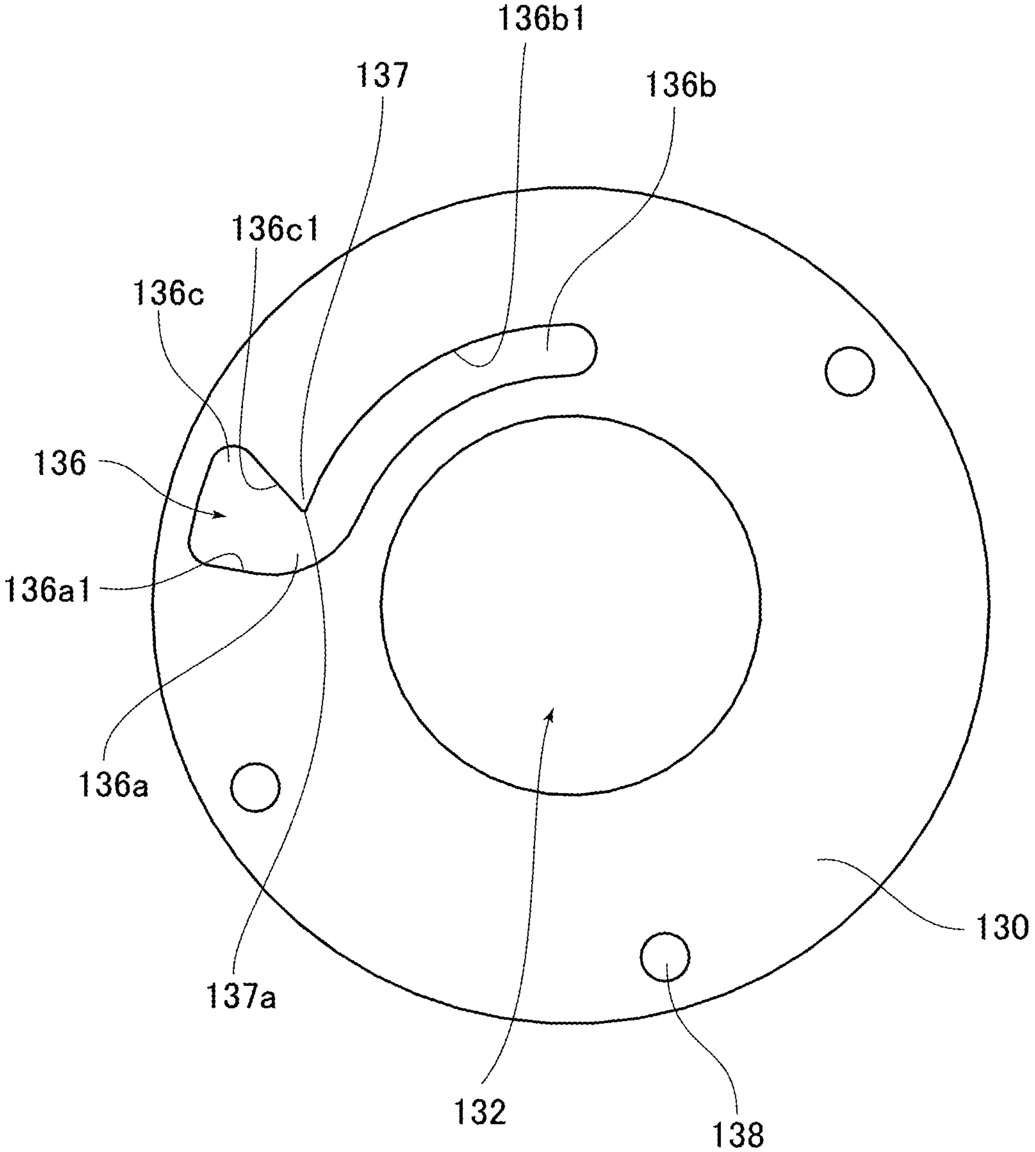
FIG. 6 is a plane view illustrating a configuration of a holding plate of the lever hoist illustrated in FIG. 1.

Further, the holding plate 130 is provided with a guide groove 136. FIG. 6 is a plane view illustrating a configuration of the holding plate 130. The guide groove 136 is a portion into which a stopper projection 141 (later explained) of the stopper member 140 enters and which guides the movement of the stopper projection 141, and has an appearance in a shape obtained by adding a groove extending in an arc shape to the center side in the radial direction of a part in an almost triangle shape. Specifically, a holding projection part 137 in an almost triangle shape as illustrated in FIG. 6 enters the guide groove 136, and the entry provides three grooves such as an allowable groove part 136*a*, a play gap groove part 136*b*, and a return regulation groove part 136*c* in the guide groove 136.

The allowable groove part 136*a* is a groove which allows the stopper projection 141 to move in the radial direction. Therefore, an inner wall 136*a*1 located on the lower side of the allowable groove part 136*a* in FIG. 6 is provided to be parallel to the radial direction (a direction of one radial line extending from the center of the center hole 132). Note that the width of the allowable groove part 136*a* is prescribed by spacing between the above inner wall 136*a*1 and a projection tip part 137*a* of the holding projection part 137 most projecting toward the inner wall 136*a*1.

Besides, the play gap groove part 136*b* is a groove which is recessed from the projection tip part 137*a* in a manner to get away from the allowable groove part 136*a* in the circumferential direction (to the right side in FIG. 6). The play gap groove part 136*b* enables the stopper projection 141 to be located with play. Here, an inner wall on the outer diameter side of the play gap groove part 136*b* (assuming to be a first regulation wall 136*b*1) is a wall surface which engages with the stopper projection 141 to hold the stopper member 140 at a predetermined position of the stopper support member 120. Note that in a state in which the stopper projection 141 is housed in the play gap groove part 136*b*, the outer diameter side of the stopper member 140 is housed in the stopper housing part 123 in a state of not projecting to the outer diameter side beyond the outer peripheral surface of the stopper support member 120.

Herein, the length of the play gap groove part 136*b* in the circumferential direction is formed to be longer than the length decided by an angle γ explained next. In other words, the ratchet wheel 80 runs idle in the lowering direction by an angle (pitch angle) obtained by dividing one circumference by the number of teeth at most when the hoisting operation is interrupted in the middle of the operation. This angle is assumed to be the angle γ (not illustrated). In this case, it is preferable form that the rotation lock device 100 also operates with a delay of an angle larger than the angle γ. To this end, in a housing state of the stopper member 140, the length of the play gap groove part 136*b* in the circumferential direction which the stopper projection 141 enters is made longer by at least the angle γ or more. In addition, it is preferable to maintain the holding of the stopper member 140 until the holding plate 130 relatively rotates by the angle γ or more with respect to the stopper support member 120 in the second rotation direction opposite to the lowering direction with respect to the drive shaft 25 and the stopper support member 120.

Note that the play gap groove part 136*b* is made sufficiently longer than the angle γ in this embodiment. Here, in the case where the length of the play gap groove part 136*b* is small, after the switching knob 45 is switched to the neutral position and the idling grip 60 is operated into the idle mode, the rotation lock device 100 comes into a state of easily operating during the idle operation of quickly pulling out the chain C1 in the lowering direction, resulting in reduced convenience to pull the chain C1. Hence, to prevent the rotation lock device 100 from immediately operating during the idle operation of pulling out the chain C1 by a hand after the switching knob 45 is switched to the neutral position into the idle mode, the length of the play gap groove part 136*b* is made sufficiently longer than the angle γ. This prevents the rotation lock device 100 from operating into the rotation lock state during the above idle operation.

Further, the return regulation groove part 136*c* is a groove recessed to get away (to the upper side in FIG. 6) from the allowable groove part 136*a* in the circumferential direction. The return regulation groove part 136*c* enables the stopper projection 141 to be located with play. However, the return regulation groove part 136*c* is provided with a second regulation wall 136*c*1. The second regulation wall 136*c*1 engages with the stopper projection 141, thereby maintaining a state in which the outer diameter side of the stopper member 140 protrudes beyond the outer peripheral surface of the stopper support member 120. In other words, the second regulation wall 136*c*1 is a wall surface for preventing the stopper member 140 from being completely housed in the stopper housing part 123.

Note that the second regulation wall 136*c*1 inclines to gradually go to the inner diameter side as coming closer to the allowable groove part 136*a*. Therefore, by rotating the stopper support member 120 and the stopper member 140 relatively to holding plate 130 in a state in which the stopper projection 141 enters the return regulation groove part 136*c*, the stopper projection 141 moves toward the allowable groove part 136*a* and then is released from the engagement with the second regulation wall 136*c*1. This enables the stopper member 140 to move to the inner diameter side of the stopper housing part 123. On the other hand, even when the stopper member 140 slides in the centrifugal direction from a predetermined position and the stopper projection 141 exceeds the projection tip part 137*a* and then the rotation acceleration of the drive shaft 25 in the first rotation direction decreases, the stopper projection 141 engages with the second regulation wall 136*c*1, whereby the stopper member 140 surely engages with the locking wall 114 and maintains the engagement while the load in the first rotation direction on the drive shaft 25 continues.

Further, the stopper housing part 123 of the above stopper support member 120 houses the stopper member 140. The stopper member 140 is housed in a state of being slidable in the centrifugal direction from the housing position with respect to the stopper housing part 123.

Here, an inner wall surface (bottom surface on the deep side) on the deep side (rotation axis side) of the stopper housing part 123 is provided in an almost semicircular shape. In the following explanation, the inner wall surface (bottom surface on the deep side) in the semicircular shape is called an arc bottom surface 123*b*. The provision of the arc bottom surface 123*b* prevents a part where a stress concentrates from being formed on the deep side of the stopper housing part 123. Specifically, when the later-explained stopper member 140 collides with the locking wall 114, its impact is transmitted also to the inner wall surface of the stopper housing part 123, and if a part where the stress concentrates exists, the section causes a breakage of the stopper support member 120 in transmitting the impact. However, the inner wall surface on the deep side of the stopper housing part 123 is the arc bottom surface 123*b* in the semicircular shape, thereby preventing the part where the stress concentrates from being formed at the arc bottom surface 123*b* in the semicircular shape when the stopper member 140 collides with the locking wall 114. Note that a later-explained arc surface 143 comes into contact with the arc bottom surface 123*b*.

Figure 7:
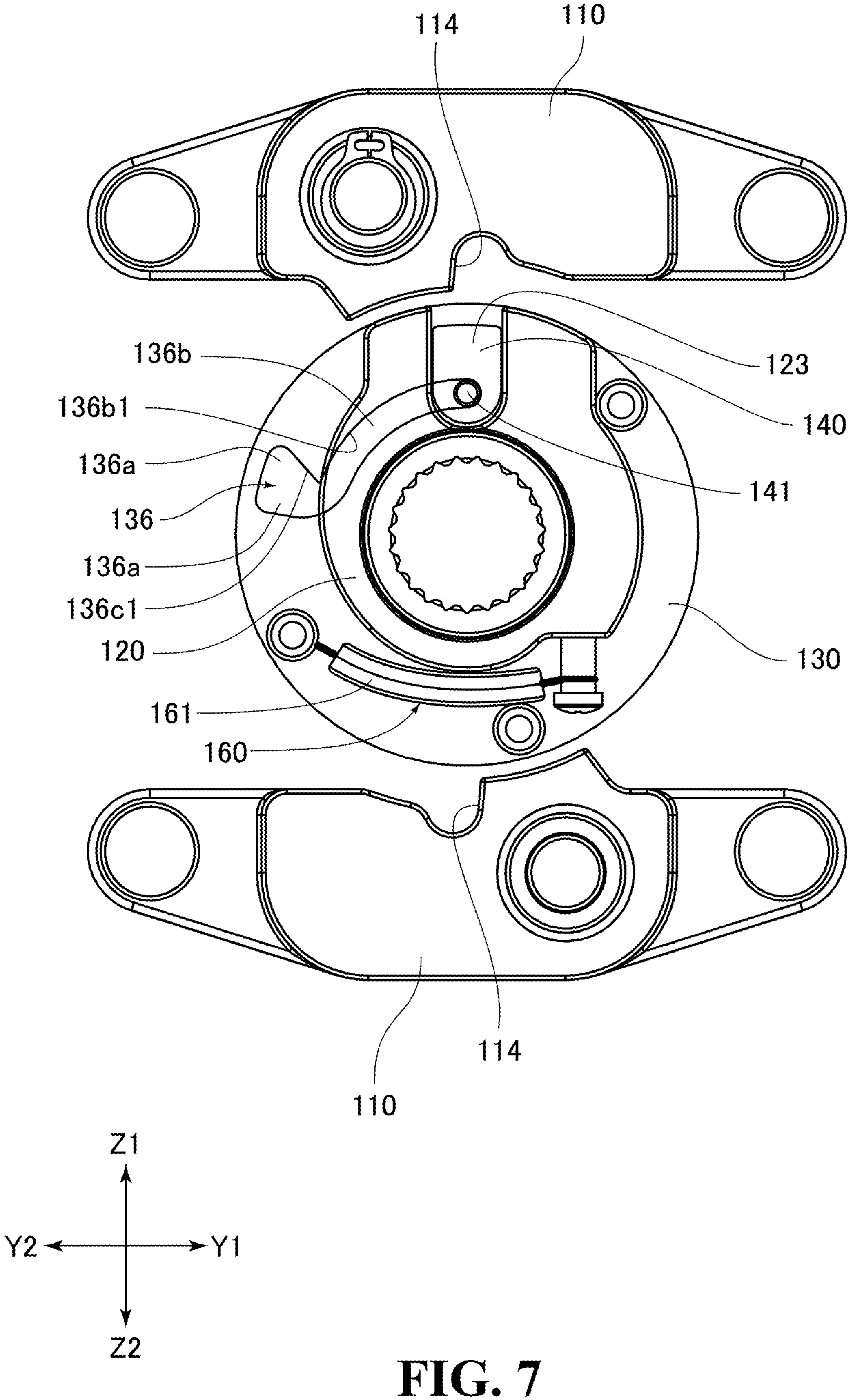
FIG. 7 is a view illustrating a configuration in the vicinity of the rotation lock (cargo fall prevention) device of the lever hoist illustrated in FIG. 1 and transparently illustrating a positional relation between parts of the rotation lock (cargo fall prevention) device before operation.

Note that in a state in which the stopper member 140 is housed at a predetermined position in the stopper housing part 123 as illustrated in FIG. 7, the outer peripheral surface of the stopper member 140 (surface on a side away from the center in the radial direction) is located on the inner diameter side than the outer peripheral surface of the stopper support member 120 with respect to the center of the rotation axis. Note that the distance of the outer peripheral surface of the stopper support member 120 is preferably provided at the same level as the distance from the center of the rotation axis to the outer peripheral surface of the holding plate 130. Note that the dimensions of the outer surface of the stopper member 140, which is separated from the center of rotation, must be set so that it does not hinder the drive shaft 25.

Here, the stopper member 140 is provided with the stopper projection 141 in a cylindrical shape. The stopper projection 141 projects in the X-axis direction toward the holding plates 130 from surfaces (front surface and rear surface) of the stopper member 140 facing the holding plates 130. Note that the stopper projection 141 is provided on a side closer to the axial center of the drive shaft 25 (stopper member 140) than the center in the depth direction (radial direction of the stopper support member 120) of the stopper member 140 as illustrated in FIG. 4 and FIG. 7 to FIG. 9. Further, the stopper projection 141 may be integrally molded with the stopper member 140. However, the stopper projection 141 may be configured such that an attachment hole is provided in the stopper member 140 and a shaft-shaped member, a pin, or the like is fitted into the attachment hole.

The stopper projection 141 enters the above guide groove 136. Thus, the stopper projection 141 slides in the guide groove 136 when the positions of the stopper support member 120 and the holding plate 130 in the rotation direction relatively change. Then, when the stopper projection 141 is located in the allowable groove part 136*a*, the stopper member 140 can project out to the outer diameter side according to the centrifugal force acting on the stopper member 140 or the pressing force from the second regulation wall 136*c*1 by an urging force of an urging spring 151.

Here, an outer peripheral surface 142 of the stopper member 140 located at the outermost side in the radial direction is provided in an arc shape similar to the outer peripheral surface of the above stopper support member 120 and the outer peripheral surface of the holding plate 130. However, the outer peripheral surface 142 may be provided in a linear shape or in another shape.

On the other hand, the outer peripheral surface of the stopper member 140 located closer to the center in the radial direction is provided in an almost semicircular shape. In the following, the outer peripheral surface in the semicircular shape is called an arc surface 143. The arc surface 143 is a portion which comes into contact with the arc bottom surface 123*b* of the above stopper housing part 123.

Here, the stopper member 140, the two holding plates 130, and the urging unit 150 are assembled to the stopper support member 120, the two holding plates 130 are coupled at a predetermined interval by the coupling member R1 (see FIG. 5), and the stopper member 140 is held at a predetermined position in the stopper housing part 123 of the stopper support member 120 by the inner wall of the guide groove 136, thereby making it possible to form a single unit. Forming the single unit as explained above makes it possible to easily and surely perform a work of removing or replacing at the assembly to the drive shaft 25 and at the maintenance. In particular, it is possible to confirm and adjust the operations of the above components formed into the single unit before the assembly to the lever hoist 10 (hoisting machine). Further, even when a large load acts on the stopper member 140, the pair of holding plates 130 can surely hold the stopper member 140 in the stopper housing part 123 of the stopper support member 120.

Note that the coupling member R1 is composed of a rivet and a collar (spacer) in this embodiment. More specifically, the collar is arranged between the pair of holding plates 130, and the rivet is inserted into hole parts 131 formed in the holding plates 130 and the collar. Thereafter, the rivet is plastically deformed at the other end side, whereby the pair of holding plates 130 are coupled in a state of maintaining the predetermined interval.

Next, the urging unit 150 will be explained. As illustrated in FIG. 4, the urging unit 150 has the urging spring 151, the one-end hooking pin 152, and the coupling member R1 corresponding to another-end hooking pin. The urging spring 151 of them is a tension spring in this embodiment. The configuration of the urging unit 150 may be the one including a compression spring or a torsion spring in addition to the one including the tension spring, and only needs to be the one which rotationally urges the holding plate 130 in one rotation direction (lowering direction; first rotation direction) being the counterclockwise direction in FIG. 4 with respect to the stopper support member 120.

Further, the one-end hooking pin 152 is attached by being plugged into the plug-in hole 124 of the stopper support member 120 as explained above. Further, one end side of the urging spring 161 is hooked on the one-end hooking pin 152. Further, the coupling member R1 also serves as the other end hooking pin. In other words, the other end side of the urging spring 151 is hooked on the coupling member R1 plugged into the hole part 131.

Here, the point of action of the one-end hooking pin 152 where the urging spring 151 is hooked and the point of action of the coupling member R1 corresponding to the other-end hooking pin where the urging spring 151 is hooked are different by a predetermined angle θ with respect to the rotation center. Accordingly, the urging spring 151 applies an urging force so as to decrease the angle θ.

Figure 10:
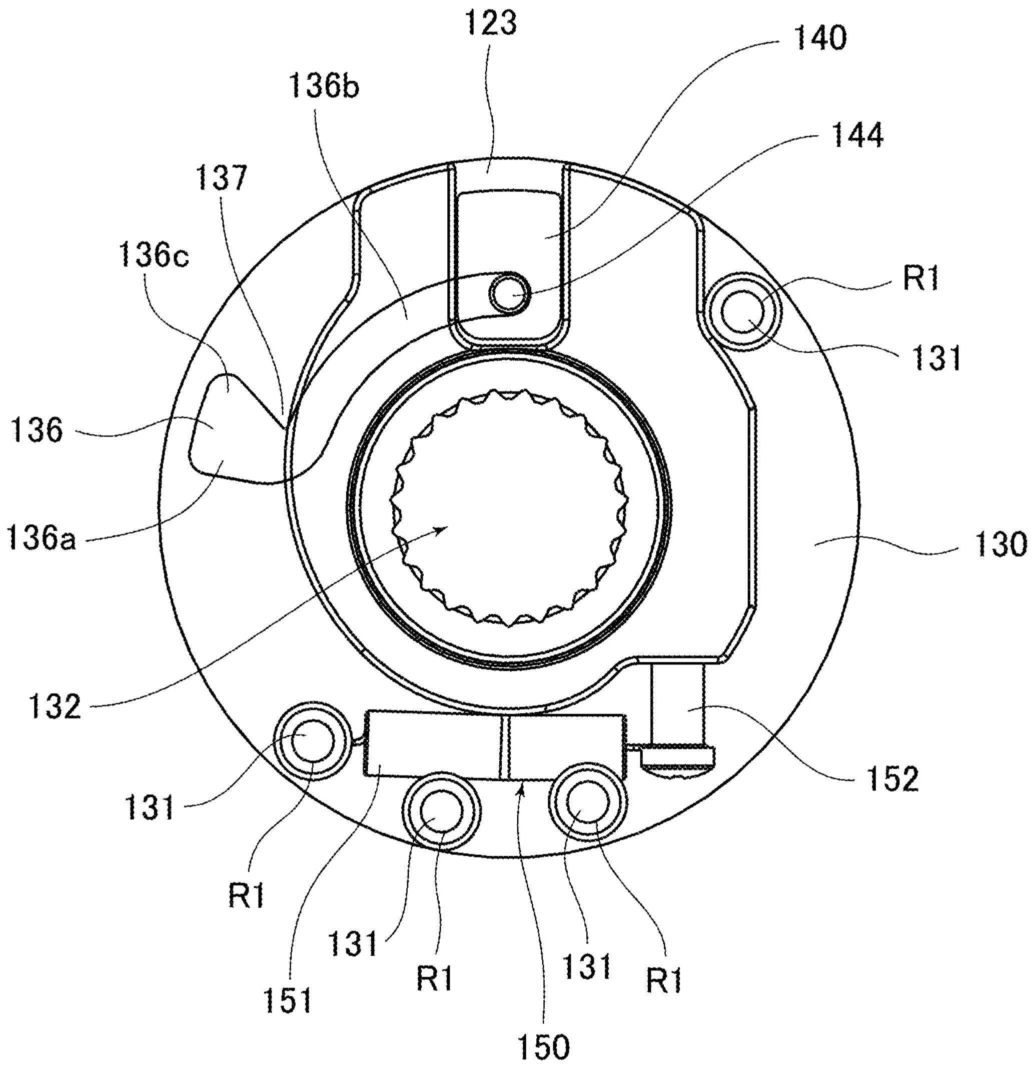
FIG. 10 relates to a modification example of the lever hoist illustrated in FIG. 1 and is a view illustrating a configuration in the vicinity of the rotation lock (cargo fall prevention) device and transparently illustrating the positional relation between parts of the rotation lock (cargo fall prevention) device before operation.

Note that in the configuration illustrated in FIG. 5, three coupling members R1 in total including the coupling member R1 corresponding to the above other-end hooking pin are provided, and three hole parts 131 in total corresponding to the three coupling members R1 are provided in the holding plate 130. However, as illustrated in FIG. 10, four coupling members R1 in total may be provided, and four hole parts 131 in total corresponding to the four coupling members R1 may be provided in the holding plate 130. Note that the numbers of the coupling members R1 and the hole parts 131 may be any numbers. Further, as the coupling member R1, any kind of coupling member such as a screw and a nut may be used as long as it couples the pair of holding plates 130 while maintaining the interval between them.

Note that FIG. 10 relates to a modification example of the lever hoist illustrated in FIG. 1 and is a view illustrating a configuration in the vicinity of the rotation lock (cargo fall prevention) device 100 and transparently illustrating the positional relation between parts of the rotation lock (cargo fall prevention) device 100 before operation. In the configuration illustrated in FIG. 10, two coupling members R1 of the four coupling members R1 are arranged adjacent to the urging spring 151. This prevents the urging spring 151 from coming off the hole parts 131. This further prevents the urging spring 151 from projecting out due to the centrifugal force by the rotation of the holding plate 130 when the one end side of the urging spring 151 comes off the one-end hooking pin 152 or the other end side thereof comes off the coupling member R1 (corresponding to the other-end hooking pin).

Further, in the configuration illustrated in FIG. 10, unlike the configuration illustrated in FIG. 4 and FIG. 5 and so on, the stopper housing part 123 is not provided with the arc bottom surface 123*b* in the arc shape but is provided with a bottom surface in a linear shape (its sign is omitted). In addition, the stopper member 140 is not provided with the arc surface 143 but is provided with a bottom surface in a linear shape (its sign is omitted).

<Regarding the Operation>

A case where the drive shaft 25 starts accelerated rotation in the lowering direction by the tensile force applied to the chain C1 due to a suspended load because the brake device 70 is broken in the hoisting operation of the lever hoist 10 in the rotation lock (cargo fall prevention) device 100 having the above configuration is considered.

Figure 8:
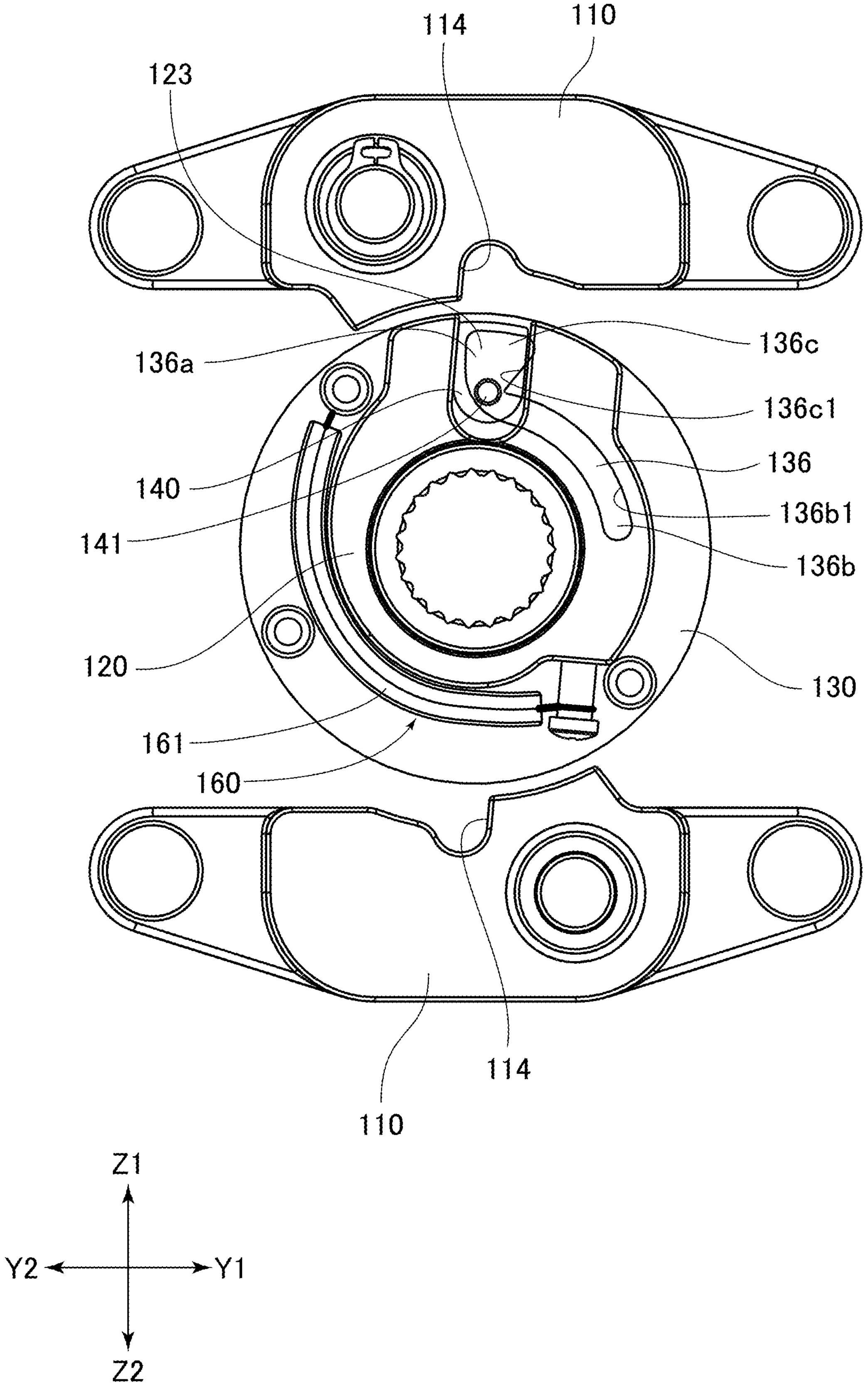
FIG. 8 is a view transparently illustrating the positional relation between the parts in a state in which a stopper support member and a holding plate relatively rotate from the state illustrated in FIG. 7 and the stopper projection reaches an allowable groove part.
Figure 9:
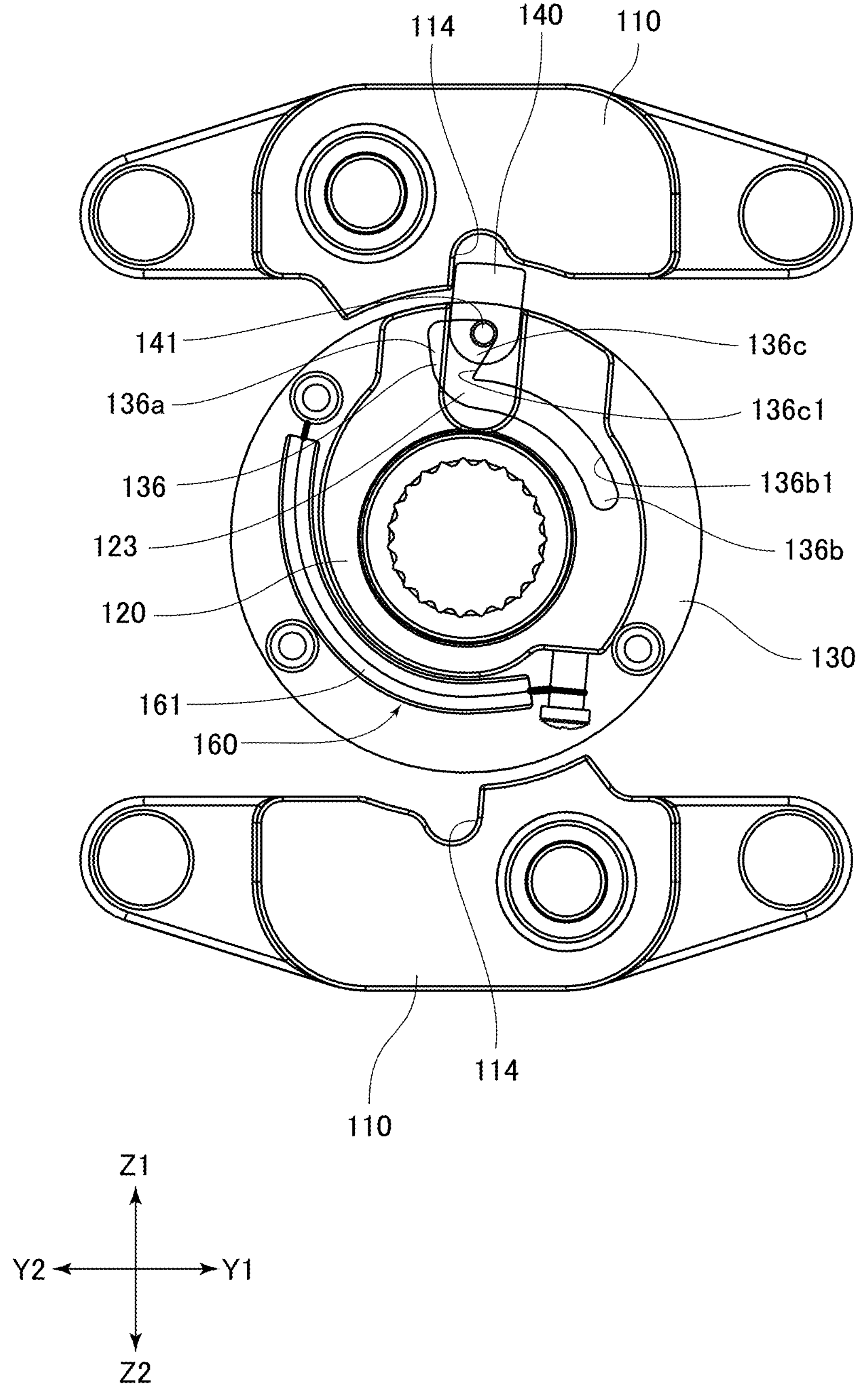
FIG. 9 is a view transparently illustrating the positional relation between the parts in a state in which a stopper member projects to the outer diameter side from the state illustrated in FIG. 8 and the stopper projection returns and is located in a return regulation groove part.

FIG. 7 is a view illustrating a configuration in the vicinity of the rotation lock (cargo fall prevention) device 100 of the lever hoist 10 illustrated in FIG. 1 and transparently illustrating the positional relation between parts of the rotation lock (cargo fall prevention) device 100 before operation. Besides, FIG. 8 is a view transparently illustrating the positional relation between the parts in a state in which the stopper support member 120 and the holding plate 130 relatively rotate from the state illustrated in FIG. 7 and the stopper projection 141 reaches the allowable groove part 136*a*. Besides, FIG. 9 is a view transparently illustrating the positional relation between the parts in a state in which the stopper member 140 projects to the outer diameter side from the state illustrated in FIG. 8 and the stopper projection 141 is located in the return regulation groove part 136*c*.

First, the drive shaft 25 and the stopper support member 120 that have lost the brake force undergo rapid increase in rotation speed in the one rotation direction (lowering direction) being the counterclockwise direction in FIG. 7 together with the stopper member 140 due to the tensile force applied to the chain C1. In this event, the urging force of the urging spring 151 acts to make the holding plate 130 follow the rotation of the stopper member 140 in a state in which the stopper projection 141 of the stopper member 140 is located at an endmost portion of the play gap groove part 136*b* (end portion on the side away from the allowable groove part 136*a*). However, when the inertial force acting on the holding plate 130 exceeds the urging force of the urging spring 151, the stopper projection 141 separates from the endmost portion of the play gap groove part 136*b* (end portion on the side away from the allowable groove part 136*a*). Further, when the drive shaft 25 rotates with acceleration together with the stopper support member 120 and the stopper member 140 at an acceleration in a direction in which the stopper projection 141 separates from the end portion (cannot follow), the urging spring 151 extends due to the inertial force acting on the holding plate 130, so that the stopper projection 141 of the stopper member 140 slides toward the allowable groove part 136*a* in the play gap groove part 136*b*.

Note that even if the stopper member 140 tries to project out to the outer diameter side due to the centrifugal force caused by the rotation of the stopper support member 120 and the stopper member 140, the stopper projection 141 is regulated by the first regulation wall 136*b*1 until the stopper projection 141 reaches the allowable groove part 136*a*, whereby the projection out of the stopper member 140 to the outer diameter side is regulated.

Then, when the stopper projection 141 relatively moves in the play gap groove part 136*b* until the position illustrated in FIG. 8, the stopper member 140 can project out to the outer diameter side. More specifically, the stopper member 140 released from the engagement (holding) state between the stopper projection 141 and the first regulation wall 136*b*1 projects out from the stopper housing part 123 to the outer diameter side due to the centrifugal force. However, the projection out to the outer diameter side falls within a range up to the outermost peripheral side of the guide groove 136. On the other hand, even when the rotation acceleration in the first rotation direction of the drive shaft 25 decreases after the stopper member 140 slides in the centrifugal direction from the predetermined position and the stopper projection 141 passes the projection tip part 137*a*, the stopper projection 141 is pressed by the second regulation wall 136*c*1 due to the urging force of the urging spring 151. This press makes the stopper member 140 project to a position where the stopper member 140 surely engages with the locking wall 114, and maintains the engagement while the load in the first rotation direction is continued on the drive shaft 25.

Then, when the stopper member 140 projecting from the stopper housing part 123 continues to rotate in the one rotation direction (lowering direction) being the counterclockwise direction, the stopper member 140 collides with the locking wall 114 of the stopper locking member 110 as illustrated in FIG. 9. This stops the rotation in the one rotation direction (lowering direction) of the stopper support member 120 and the drive shaft 25 to stop the fall of the cargo.

Further, after the stopper member 140 collides with the locking wall 114, the stopper projection 141 enters the return regulation groove part 136*c*. Thus, after the drive shaft 25 stops, the stopper projection 141 receives a counterclockwise urging force from the second regulation wall 136*c*1 due to the urging force of the urging spring 151, so that the state in which the stopper projection 141 enters the return regulation groove part 136*c* is maintained. In this event, even if the stopper member 140 tries to improperly return to the stopper housing part 123, the stopper projection 141 maintains the engagement with the second regulation wall 136*c*1, whereby the return of the stopper member 140 to the stopper housing part 123 is regulated. Therefore, the rotation stop state of the drive shaft 25 is maintained. In other words, the cargo is prevented from starting to fall again.

Next, the idle mode being a state in which the chain C1 can be pulled out in the lowering direction by a hand while the brake device 70 is normally operating is considered. The lever hoist 10 has a function capable of bringing about the idle mode in a no-load state. Specifically, the lever hoist 10 has a function of opening the brake of the female screw member 35 of the brake device 70 by the action of the idle spring (not illustrated). In the idle mode, the length of the chain C1 can be adjusted at a speed higher than that operated by the operation of the operation lever 50. Examples of switching to the idle mode include switching by an automatic idle system capable of switching only by putting the switching knob 45 into neutral in a no-load state, and switching to the idle mode by operating the switching knob 45 into neutral and then performing a predetermined operation of the idling grip 60. This embodiment employs the latter switching structure capable of switching to the idle mode by operating the switching knob 45 into neutral and then performing the predetermined operation of the idling grip 60, and its details will be explained later.

In the idle mode, the brake force of the brake device 70 is made not to act temporarily. However, for safety, the brake device 70 is configured to act to stop the rotation of the drive shaft 25 when a predetermined or more tensile force acts in the lowering direction on the chain C1. On the other hand, in the brake device 70 having the ratchet wheel 80 employed in the lever hoist 10, a brake does not work in the hoisting direction, thus making it possible to adjust the length of the chain C1 at a speed higher than that in the lowering direction. In the lever hoist 10 in this state, the rotation lock (cargo fall prevention) device 100 also has better workability in a case where it does not act in the hoisting direction (other rotation direction) as much as possible.

In a case where the operator pulls the chain C1 in the hoisting direction, the load sheave 20 rotates in the hoisting direction, and the drive shaft 25, the stopper support member 120, and the stopper member 140 also rotate in the hoisting direction. In this event, the inertial force acting on the holding plate 130 acts in a direction of pressing the stopper projection 141 against the endmost portion of the play gap groove part 136*b* (end portion on the side away from the allowable groove part 136*a*). Therefore, even if the stopper member 140 tries to project out from the inside of the stopper housing part 123 to the outer diameter side, the stopper projection 141 is regulated by the first regulation wall 136*b*1, whereby the projection out becomes impossible.

On the other hand, in a case where the operator pulls the chain C1 in the lowering direction, the load sheave 20 rotates in the lowering direction, and the drive shaft 25, the stopper support member 120, and the stopper member 140 also rotate in the lowering direction. In this event, the holding plate 130 relatively rotates against the urging force of the urging spring 151 in a manner to be left behind due to the rotation acceleration of the stopper support member 120 and the stopper member 140, and the stopper projection 141 may separate from the endmost portion of the play gap groove part 136*b* (end portion on the side away from the allowable groove part 136*a*). In this case, if the length of the play gap groove part 136*b* is small, the stopper projection 141 relatively easily reaches the allowable groove part 136*a*, and then the stopper member 140 projects to the outer diameter side, resulting in a lock state in which the locking wall 114 and the stopper member 140 collide with each other. In this case, the operation of pulling the chain C1 in the lowering direction by the operator is interrupted, and the lock state needs to be released, resulting in deterioration in workability.

However, the length of the play gap groove part 136*b* is sufficiently longer than the above angle γ in this embodiment, and is set at a level at which the stopper projection 141 even if slightly moving in the play gap groove part 136*b* cannot reach the allowable groove part 136*a* at the rotation acceleration at a level of pulling the chain C1 in the lowering direction by the operator. This prevents interruption of the operation of pulling the chain C1 in the lowering direction by the operator. The length of the play gap groove part 136*b* is set so that in the case where the drive shaft 25 rapidly rotates in the lowering direction in the idle mode, the brake device 70 temporarily released by the idle mode brakes the rotation of the drive shaft 25 earlier than the rotation lock device 100.

<Regarding the Effect>

The rotation lock (cargo fall prevention) device 100 of the above configuration includes: the stopper support member 120 attached to the drive shaft 25 (shaft-shaped member) and rotating integrally with the drive shaft 25 (shaft-shaped member); the stopper member 140 supported by the stopper support member 120 in the state of being slidable outward from the axial center side of the drive shaft 25 (shaft-shaped member); the holding plate 130 (holding means) configured to hold the stopper member 140 at the predetermined position of the stopper support member 120; the urging spring 151 (urging means) configured to urge the holding plate 130 (holding means) toward the first rotation direction being one rotation direction with respect to the stopper member 140; and the stopper locking member 110 (stopper locking means) fixed to the frames 11, 12 rotatably supporting the drive shaft 25 (shaft-shaped member) and configured to stop the rotation of the drive shaft 25 (shaft-shaped member) by engaging with the stopper member 140. Further, when the drive shaft 25 (shaft-shaped member) accelerates the rotation toward the first rotation direction, the holding force for the stopper member 140 by the holding plate 130 (holding means) is decreased and/or released by the inertial load of the holding plate 130 (holding means) and the stopper member 140 projects from the predetermined position to the position where the stopper member 140 engages with the stopper locking member 110 (stopper locking means) to stop the rotation of the drive shaft 25 (shaft-shaped member).

With the above configuration, when the drive shaft 25 (shaft-shaped member) exceeds a predetermined acceleration in the one rotation direction, the rotation lock (cargo fall prevention) device 100 can operate to stop the rotation. Further, the configuration of the holding plate 130 (holding means) can be selected so that when the drive shaft 25 (shaft-shaped member) exceeds the predetermined rotation speed in a state of rotating in a second rotation direction being the other rotation direction, the rotation lock (cargo fall prevention) device 100 operates.

Further, it can be set that when the drive shaft 25 (shaft-shaped member) rotates with acceleration in the first rotation direction being the one rotation direction, the rotation lock (cargo fall prevention) device 100 operates at a speed lower than the rotation speed in the case of rotating in the other rotation direction by the synergistic action of the acceleration and the rotation speed. Further, even if the brake device 70 fails in a drive device in which a load only works in one direction such as a hoisting machine or a lift device, the rotation of the rotation member for hoisting or lift driving can be immediately stopped to prevent an accident due to a fall of a cargo.

Further, in this embodiment, the holding means has a holding plate 130 in a disk shape, the holding plate 130 has a bearing hole (center hole 132) pivotally supported to be rotatable around the axial center of the shaft-shaped member, the stopper support member 120 and the holding plate 130 are coupled by the urging means (urging unit 150), the stopper member 140 has the stopper projection 141 projecting toward the holding plate 130, the holding plate 130 has the holding projection part 137 configured to engage with the stopper projection 141 to hold the stopper member 140 at a predetermined position in the radial direction of the stopper support member 120, and the holding projection part 137 has the first regulation wall **136*b*1 with which the stopper member 140 engages at a predetermined position in the radial direction, and the second regulation wall 136*c*1 with which the stopper member 140 engages at a position where the stopper member 140** projects to the outer diameter side from the predetermined position in the radial direction.

With the above configuration, the holding means (holding plate 130) can hold the stopper member 140 at the predetermined position of the stopper housing part 123 until the holding means (holding plate 130) causes a predetermined delay or the drive shaft 25 and the holding means (holding plate 130) exceed the predetermined relative angle with respect to the stopper support member 120 rotating integrally with the drive shaft 25 starting to rapidly rotate in the first rotation direction. Further, the length of the first regulation wall **136*b*1 of the holding projection part 137 can be freely set regardless of the size of the stopper member 140**.

Besides, in the modification example of this embodiment, when the drive shaft 25 being the shaft-shaped member rotates with acceleration toward the first rotation direction, the holding plate 130 constituting the holding means relatively rotates in a direction opposite to the first rotation with respect to the drive shaft 25 against the urging force of the urging means (urging unit 150), and the holding plate 130 constituting the holding means holds the stopper member 140 at the predetermined position in the radial direction until an angle of the relative rotation exceeds a predetermined angle.

With the above configuration, it can be set that the rotation lock device 100 of the present invention, when provided, for example, as an emergency stop brake in the hoisting machine such as the lever hoist 10, operates later than a normal brake (brake device 70) of the hoisting machine such as the lever hoist 10. Accordingly, the rotation lock device 100 of the present invention never hinders the operation of the normal brake (brake device 70) in a use state of the hoisting machine such as the normal lever hoist 10.

Further, in this embodiment, the shaft-shaped member (drive shaft 25) is integrally coupled to the load sheave 20 around which the chain C1 is wound.

With the above configuration, it becomes possible to surely prevent a fall of a cargo in the hoist of hoisting or lowering the chain C1 by the load sheave 20.

Further, in this embodiment, the lever hoist includes 10: the load sheave 20 which is pivotally supported by the pair of frames 11, 12 and around which the chain C1 configured to hoist the cargo is wound; the drive shaft 25 coupled to the load sheave 20 via the reduction gear 30; the brake device 70 attached to the drive shaft; and the operation lever 50 configured to perform a rotation drive operation on the load sheave 20 in the hoisting direction and the lowering direction, wherein: on the outer periphery of the drive shaft 25, the rotation lock (cargo fall prevention) device 100 is arranged; and the stopper locking member 110 (stopper locking means) is attached to the frame 12.

With the above configuration, it becomes possible to surely prevent a fall of a cargo even if the brake device 70 fails.

Further, the lever hoist 10 (hoisting machine) in this embodiment includes: the brake device 70 including the ratchet mechanism (corresponding to the ratchet wheel 80, the pawl member 90, and the pawl shaft 115) including: the ratchet wheel 80 which is attached to the periphery of the drive shaft 25 (shaft-shaped member) and has the ratchet tooth 83 on the outer peripheral side; the pawl member 90 which engages with the ratchet tooth 83; and the pawl shaft 115 which pivotally supports the turn of the pawl member 90, the ratchet mechanism being configured to allow the rotation in the hoisting direction of the ratchet wheel 80 by engagement between the ratchet tooth 83 and the pawl member 90 and to disallow the rotation in the lowering direction; and the rotation lock device 100 configured to lock the rapid rotation of the drive shaft 25 (shaft-shaped member). Further, the rotation lock device 100 includes: the stopper support member 120 attached to the drive shaft 25 (shaft-shaped member) and rotating integrally with the drive shaft 25 (shaft-shaped member); the stopper member 140 supported by the stopper support member 120 in the state of being slidable outward from the axial center side of the drive shaft 25 (shaft-shaped member); the holding plate 130 (holding means) configured to hold the stopper member 140 at the predetermined position of the stopper support member 120; the urging unit 150 (urging means) configured to urge the holding plate 130 (holding means) toward the lowering direction with respect to the stopper member 140; and the stopper locking member 110 (stopper locking means) having the locking wall 114 which stops the rotation of the drive shaft 25 (shaft-shaped member) by contact with the stopper member 140.

Further, when the drive shaft 25 (shaft-shaped member) accelerates the rotation toward the lowering direction, the holding force for the stopper member 140 by the holding plate 130 (holding means) is released by the inertial load of the holding plate 130 (holding means) to cause the stopper member 140 to project from the predetermined position to the position where the stopper member 140 engages with the stopper locking member 110 (stopper locking means) to thereby stop the rotation of the drive shaft 25 (shaft-shaped member), and each stopper locking member 110 (stopper locking means) is integrated with the pawl shaft 115; and the stopper locking member 110 (stopper locking means) is attached to the frame 12 via the stay bolt B1 (fastening member).

In the case of the above configuration, the holding force for the stopper member 140 by the holding plate 130 (holding means) is released by the inertial load of the holding plate 130 (holding means) due to the acceleration of the rotation of the drive shaft 25 (shaft-shaped member) occurring when the brake device 70 fails. Thus, the stopper member 140 projects from the predetermined position to the position where the stopper member 140 engages with the stopper locking member 110 (stopper locking means), thereby making it possible to surely stop the rotation of the drive shaft 25 (shaft-shaped member).

Further, the pawl shaft 115 is integrated with the stopper locking member 110 (stopper locking means), and the stopper locking member 110 (stopper locking means) is attached to the frame 12 via the stay bolt B1 (fastening member). Therefore, the attachment strength can be significantly improved compared to the attachment strength when the pawl shaft 115 is attached to the hole portion of the frame 12 by press fitting or the like.

Further, in this embodiment, the pair of the stopper locking members 110 (stopper locking means) are provided at positions different in the circumferential direction of the drive shaft 25 (shaft-shaped member), and the space is provided between one of the stopper locking members 110 (stopper locking means) and the other of the stopper locking members 110 (stopper locking means).

Since the space SP1 is provided between the pair of stopper locking members 110 (stopper locking means), the stopper locking member 110 can be reduced in weight as compared with the case where the stopper locking member (stopper locking means) is provided over the whole circumference on the outer peripheral side of the stopper support member 120 and the holding plate 130.

Further, in this embodiment, the holding plate 130 (holding means) has the holding plate 130 in the disk shape, and the holding plate 130 has the center hole 132 (bearing hole) pivotally supported to be rotatable around the axial center of the drive shaft 25 (shaft-shaped member). Further, the stopper support member 120 and the holding plate 130 are coupled by the urging unit 150 (urging means), the stopper member 140 has the stopper projection 141 projecting toward the holding plate 130, the holding plate 130 has the guide groove 136 configured to engage with the stopper projection 141 to hold the stopper member 140 at the predetermined position in the radial direction of the stopper support member 120, and the guide groove 136 has the first regulation wall **136*b*1 with which the stopper member 140 engages at the predetermined position in the radial direction and the second regulation wall 136*c*1 with which the stopper member 140 engages at the position where the stopper member 140 projects to the outer diameter side from the predetermined position in the radial direction. Further, the first regulation wall 136*b*1 is formed of an arc coaxially with the center hole 132**.

With the above configuration, the holding plate 130 (holding means) can smoothly relatively rotate coaxially with the stopper support member 120 and has a simple structure, thus enabling downsizing of the rotation lock (cargo fall prevention) device 100. Further, the stopper member 140, the two holding plates 130, and the urging unit 150 are assembled to the stopper support member 120, and the two holding plates 130 are coupled by the coupling member R1 at a predetermined interval, thereby making it possible to form a single unit. Further, the assembly performance becomes excellent. Note that the bearing hole (center hole 132) is pivotally supported at the outer periphery of the bearing boss part 122 of the stopper support member 120, but may be directly pivotally supported by the drive shaft 25 (shaft-shaped member).

With the above configuration, the holding means (holding plate 130) can hold the stopper member 140 at the predetermined position of the stopper housing part 123 until the holding means (holding plate 130) causes a predetermined delay or until the drive shaft 25 (shaft-shaped member) and the holding means (holding plate 130) exceed the predetermined relative angle with respect to the stopper support member 120 rotating integrally with the drive shaft 25 (shaft-shaped member) starting to rapidly rotate in the first rotation direction. Further, the length of the first regulation wall **136*b*1 of the guide groove 136 can be freely set regardless of the size of the stopper member 140. Thus, it is possible to set a state in which only a slight movement of the stopper projection 141 in the guide groove 136 does not cause the stopper member 140 to move to the outer diameter side, by regulating the movement of the stopper projection 141 in the radial direction by the first regulation wall 136*b*1, thus preventing interruption of the operation of pulling the chain C1** in the lowering direction by the operator in the idle operation.

Further, in this embodiment, the holding plate 130 is formed with the play gap groove part **136*b* along the circumferential direction, and the stopper projection 141 is movable along the play gap groove part 136*b*, and the first regulation wall 136*b*1 is the wall surface on the outer diameter side of the play gap groove part 136*b***.

With the above configuration, the stopper projection 141 is configured to slide in the play gap groove part **136*b* along the circumferential direction, so that the length of the play gap groove part 136*b* can be appropriately set to appropriately adjust the timing when the rotation lock device 100** operates.

Further, in this embodiment, the stopper support member 120 is provided with the stopper housing part 123 in the concave shape which houses the stopper member 140 and the stopper member 140 is housed in the stopper housing part 123 when the stopper member 140 does not project to the outer diameter side, the arc bottom surface **123*b* in the arc shape is provided on the deep side of the stopper housing part 123 being the inner diameter side of the drive shaft 25 (shaft-shaped member), and the arc surface 143 with the arc-shaped side surface of the stopper member 140 engaging with the stopper housing part 123 is provided on the inner diameter side of the drive shaft 25** (shaft-shaped member).

The provision of the arc bottom surface **123*b* on the inner diameter side (deep side) of the stopper housing part 123 prevents formation of a part where the stress concentrates on the deep side of the stopper housing part 123. This prevents breakage of the stopper support member 120. Further, the provision of the arc surface 143 in the arc shape also at the stopper member 140 prevents a sharp corner portion of the stopper member 140 from colliding with the side wall 123*a* in the stopper housing part 123 when the stopper member 140 collides with the locking wall 114. This makes it possible to prevent damage to the side wall 123*a***.

Further, in this embodiment, when the drive shaft 25 (shaft-shaped member) rotates with acceleration toward the first rotation direction, the holding plate 130 (holding means) relatively rotates in the direction opposite to the first rotation with respect to the drive shaft 25 (shaft-shaped member) against the urging force of the urging unit 150 (urging means), and the holding plate 130 (holding means) holds the stopper member 140 at the predetermined position in the radial direction until the angle of the relative rotation exceeds the predetermined angle.

With the above configuration, the rotation lock device 100 can be set to operate later than the normal brake (brake device 70) of the hoisting machine such as the lever hoist 10. Accordingly, the rotation lock device 100 of the present invention never hinders the operation of the normal brake (brake device 70) in a use state of the hoisting machine such as the normal lever hoist 10.

Further, in this embodiment, the hoisting machine is the lever hoist 10 and includes: the load sheave 20 which is pivotally supported by the pair of frames 11, 12 and around which the chain C1 configured to hoist the cargo is wound; the drive shaft 25 (corresponding to the shaft-shaped member) coupled to the load sheave 20 via the reduction gear 30; and the operation lever 50 configured to perform the rotation drive operation on the load sheave 20 in the hoisting direction and the lowering direction.

With the above configuration, the lever hoist 10 can surely prevent a fall of the cargo even if the brake device 70 fails.

Second Embodiment

Hereinafter, a rotation lock (cargo fall prevention) device 200 of a lever hoist 10 according to a second embodiment of the present invention will be explained based on the drawings.

Figure 11:
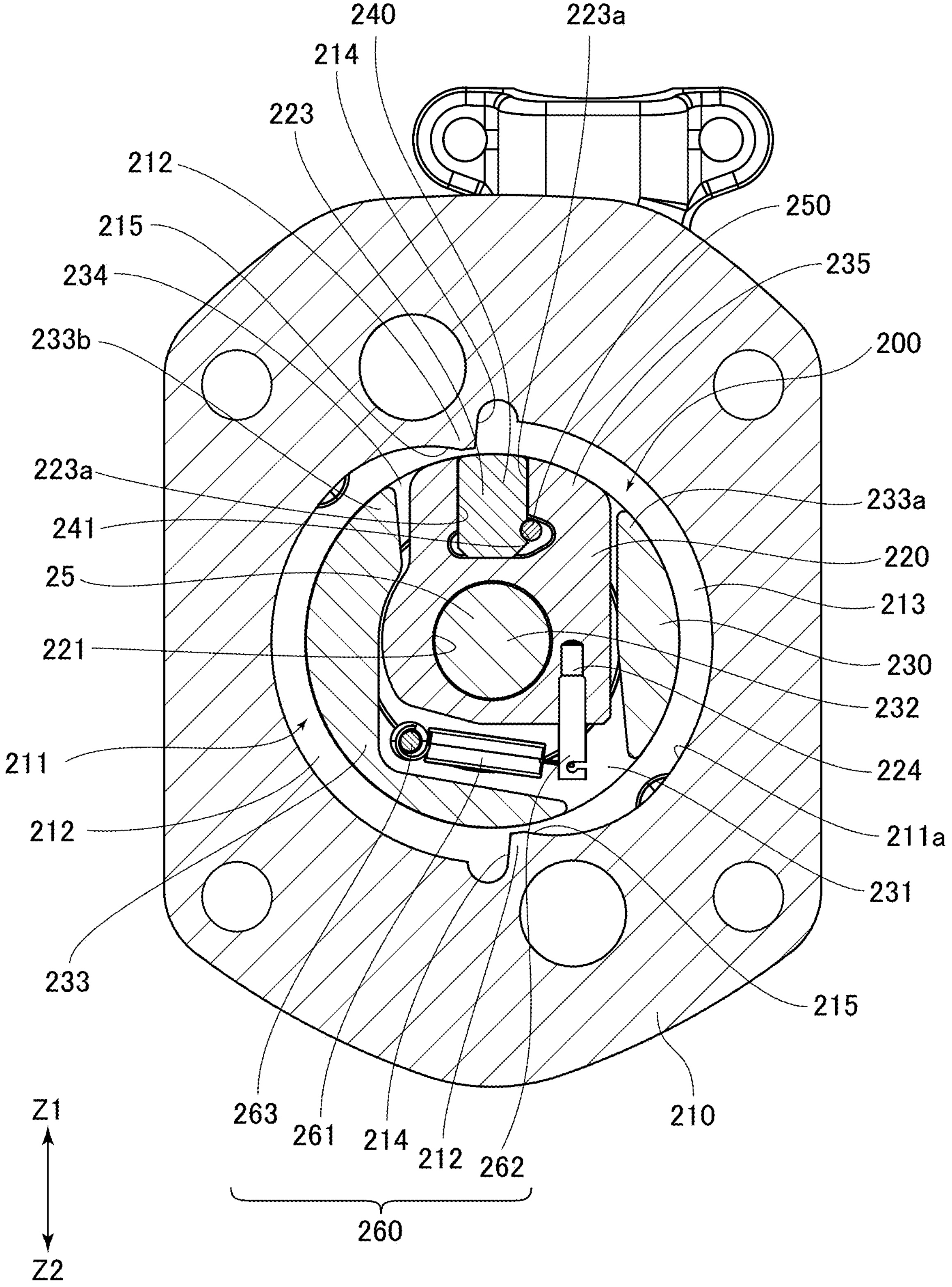
FIG. 11 is a cross-sectional view illustrating a configuration in the vicinity of a rotation lock (cargo fall prevention) device according to a second embodiment of the present invention.

FIG. 11 is a cross-sectional view illustrating a configuration in the vicinity of the rotation lock (cargo fall prevention) device 200 according to the second embodiment. FIG.

12 is an exploded perspective view illustrating the configuration of the rotation lock (cargo fall prevention) device 200 illustrated in FIG. 11. FIG. 13 is an exploded perspective view illustrating the configuration of the rotation lock (cargo fall prevention) device 200 and illustrating a state viewed from an angle different from that of FIG. 12.

Figure 12:
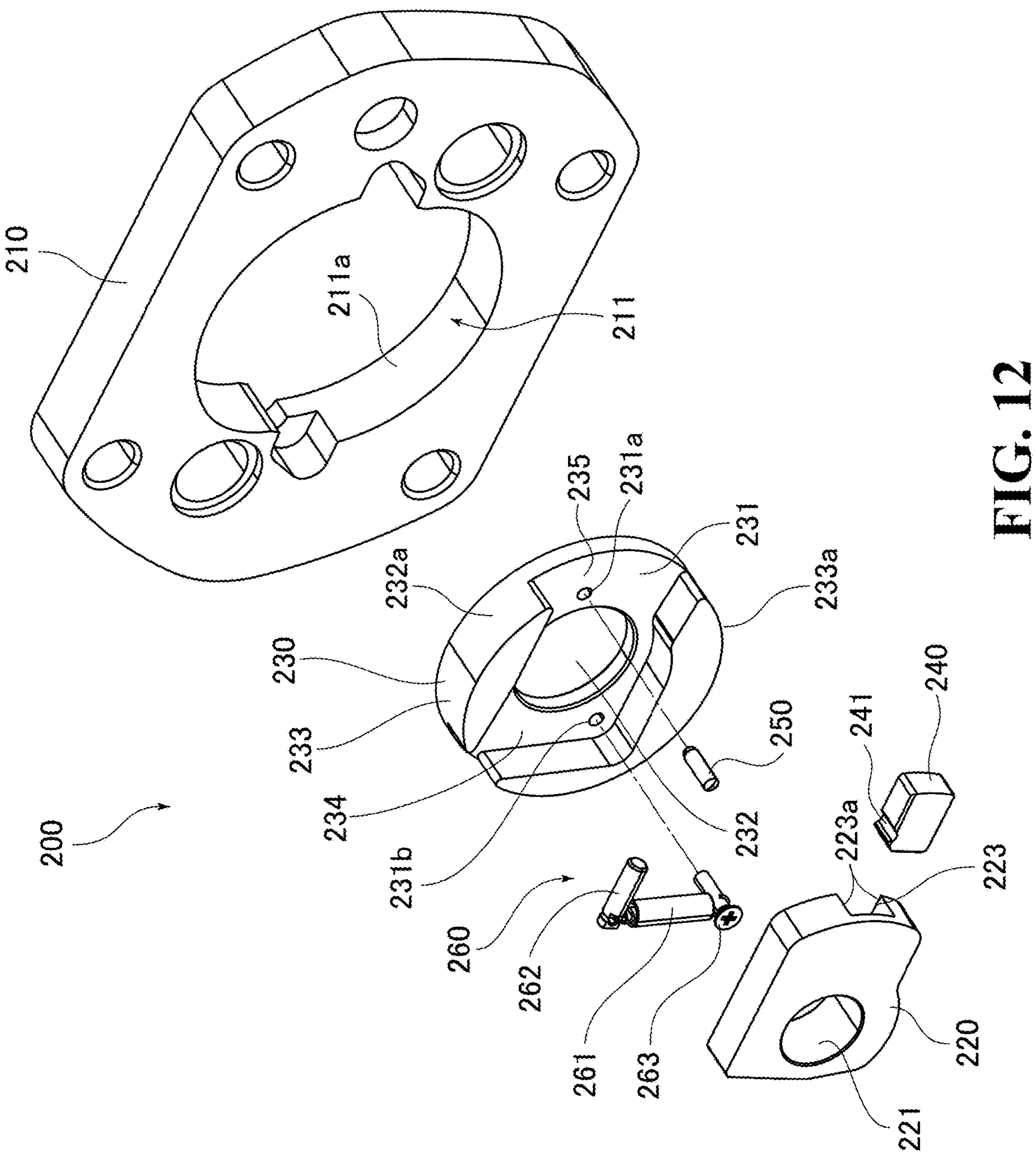
FIG. 12 is an exploded perspective view illustrating the configuration of the rotation lock (cargo fall prevention) device illustrated in FIG. 11.
Figure 13:
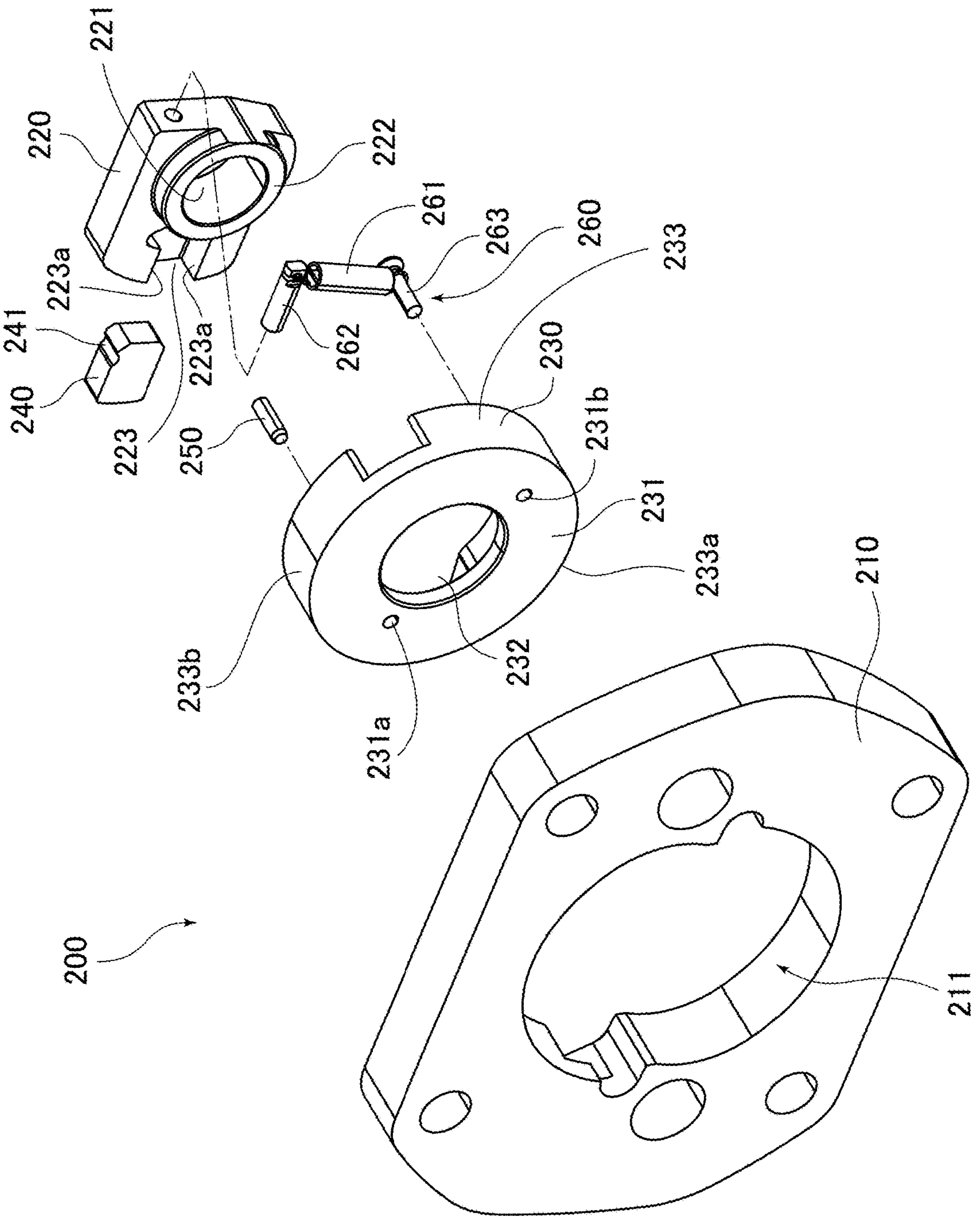
FIG. 13 is an exploded perspective view illustrating the configuration of the rotation lock (cargo fall prevention) device and illustrating a state viewed from a different angle from that of FIG. 12.

As illustrated in FIG. 11 to FIG. 13, a locking plate 210 in a plate shape is attached to the ratchet wheel 80 side of the frame 12 in this embodiment, and an insertion hole 211 is provided on the center side of the locking plate 210. Into the insertion hole 211, the drive shaft 25, a stopper support member 220, and a holding plate 230 are inserted.

Further, the locking plate 210 is provided with an inner protruding part 212 and a locking concave part 213 along an inner wall surface 211*a* of the insertion hole 211. The inner protruding part 212 is a portion which protrudes more to the inner diameter side than the locking concave part 213. The inner protruding part 212 is opposed to the outer peripheral surfaces of the later-explained stopper support member 220 and holding plate 230 in a state of having a slight gap therebetween. This forms a configuration not hindering the rotation of the stopper support member 120 and the holding plate 130 which support the stopper member 240 at the holding position. Note that two inner protruding parts 212 are provided at an interval of 180 degrees in the circumferential direction in this embodiment.

Further, the locking concave part 213 is a portion which is located in the circumferential direction continuous to the inner protruding part 212. In this embodiment, the locking concave part 213 is a portion of the inner wall surface 211*a* between the pair of inner protruding parts 212 and is provided large in length of the locking concave part 213 in the circumferential direction as illustrated in FIG. 11. However, the inner protruding part 212 may be formed to be larger in length in the circumferential direction than the locking concave part 213. However, even in the case where the length of the locking concave part 213 in the circumferential direction is made small, the locking concave part 213 needs to have a length and depth which a later-explained stopper member 240 can enter the inside of the locking concave part 213. A radius of the inner wall surface 211*a* at which the locking concave part 213 is located from the axial center of the drive shaft 25 is fixed to regulate the projection of the stopper member 240 to a predetermined range. Here, a length portion of about one-third of the length of the stopper member 240 can project into the locking concave part 213.

Further, the inner protruding part 212 is provided with a locking wall 214. The locking wall 214 is a wall surface which protrudes into the locking concave part 213 and collides with the stopper member 240 rotating in the one rotation direction (lowering direction) to stop the rotation of the load sheave 20. Therefore, the locking wall 214 is in a shape of not pushing the stopper member 240 back in the rotation axial core direction, and the side surface of the stopper member 240 is also in a shape of not being pushed back due to the collision with the locking wall 214.

Note that the inner wall surface 211*a* on the side opposite to the locking wall 214 of the inner protruding part 212 is a tapered wall 215 as illustrated in FIG. 11 in this embodiment. The tapered wall 215 is a wall surface inclined with respect to the radial direction, the locking wall 214 is located at an end portion of the locking concave part 213 in the lowering direction of the drive shaft 25, and the tapered wall 215 is located at an end portion in the hoisting direction. The tapered wall 215 is a wall surface for pushing the stopper member 240 projecting to the locking concave part 213 back from the locking concave part 213 in the axial center direction by rotating the drive shaft 25 in the hoisting direction. Note that only one inner protruding part 212 and one locking concave part 213 may be provided, and three or more inner protruding parts 212 and three or more locking concave parts 213 may be provided. The tapered wall 215 corresponds to an engagement release wall. Further, a locking wall may be arranged in place of the tapered wall 215. In this case, the stopper member 240 is maintained in a state of projecting to the locking concave part 213 even if the drive shaft 25 is rotated in the hoisting direction, and the rotation in the hoisting direction is regulated by the locking wall.

Note that the stopper support member 220 in this embodiment is configured similarly to the stopper support member 120 in the first embodiment. Specifically, the stopper support member 220 includes a center hole 221, a bearing boss part 222, a stopper housing part 223, and a plug-in hole 224 similar to the above center hole 121, bearing boss part 122, stopper housing part 123, and plug-in hole 124. The stopper support member 220 is attached to the drive shaft 25 in the center hole 221 and thereby rotated integrally with the drive shaft 25. Note that the attachment of the stopper support member 220 to the drive shaft 25 may be any kind of attachment such as a setscrew, key-coupling, spline coupling, or the like as long as it can transmit necessary torque.

Next, the holding plate 230 will be explained. Note that the holding plate 230 constitutes a holding means together with a holding pin 250. The holding plate 230 is provided with a rotation plate part 231 in a disk shape, and provided with a center hole 232 at the center in the radial direction of the rotation plate part 231. The bearing boss part 222 is fitted into the center hole 232, whereby the holding plate 230 is turnably supported coaxially with the stopper support member 220. Note that a distance from the rotation center to the outermost periphery (namely, a radius) of the holding plate 230 is at the same level as that to the outermost periphery of the stopper support member 220. However, any one of the radii of the stopper support member 220 and the holding plate 230 may be provided to be larger.

Note that one holding plate 230 is configured to cantilever-support the holding pin 250, but when the load acting thereon is large, two holding plates are arranged across the stopper support member 220. In addition, the holding plates 230 may be coupled by a coupling member, and the two holding plates 230 may hold both ends of the holding pin 250, respectively. Alternatively, the holding pin 250 itself may couple both the holding plates 230.

Further, a peripheral wall part 233 is built up on the outer peripheral side of the rotation plate part 231. Further, by surrounding with the rotation plate part 231 and the peripheral wall part 233, a range turnable with respect to the stopper support member 220 is prescribed. In the following explanation, a portion turnable with respect to the stopper support member 220 is a loosely fit part 234. The peripheral wall part 233 corresponds to a weight increasing the inertial load of the holding plate 230, and the provision of the peripheral wall part 233 on the outer peripheral side of the holding plate 230 contributes to reduction in size and weight of the whole such as reduction in thickness of the rotation plate part 231. The configuration of the peripheral wall part 233 produces the effect, especially, in application to the shaft-shaped member rotating at a low speed.

Here, to prescribe the turn range of the stopper support member 220, the peripheral wall part 233 is provided with a first peripheral wall part 233*a* which prescribes one end side of the turn range and a second peripheral wall part 233*b* which prescribes the other end side of the turn range. However, the first peripheral wall part 233a and the second peripheral wall part 233b may be continuously and integrally provided. Further, between the first peripheral wall part 233a and the second peripheral wall part 233b, an opening 235 for positioning the stopper support member 220 is provided. Accordingly, the outer peripheral side of the stopper support member 120 is provided to be turnable only in a prescribed angle range in a state of exposing from the opening 235.

Note that in the holding state of the later-explained stopper member 240, the stopper support member 220 comes into contact with the first peripheral wall part 233a at a position which corresponds to the holding position. Further, a release position where the stopper support member 220 separates from the first peripheral wall part 233a to release the holding of the stopper member 240 corresponds to a holding release position. Note that to set the device so that the rotation lock device operates only when the acceleration of the drive shaft 25 as a target is very high, it is better to omit the peripheral wall part 233 in some cases.

Further, the above stopper housing part 223 houses the stopper member 240. The stopper member 240 is housed in a state of being slidable in the centrifugal direction from the housing position with respect to the stopper housing part 223. However, another side wall 223a of the stopper housing part 223 has a play part 223b provided to be recessed from the side surface which is capable of positioning the later-explained holding pin 250 with play. A holding concave part 241 for making the holding pin 250 engage with the stopper member 240 is provided on the side surface of the stopper member 240 facing the play gap part 223b. By maintaining the engagement state between the holding concave part 241 and the holding pin 250, the state in which the stopper member 240 is housed at a predetermined position (housing position) of the stopper housing part 223 is maintained.

Note that the outermost peripheral surface of the stopper member 240 is provided at a distance at the same level as that of the stopper support member 220 with respect to the rotation axial center in a state in which the stopper member 240 is housed at the predetermined position in the stopper housing part 223 as illustrated in FIG. 11. Further, the outermost peripheral surface of the stopper member 240 is preferably provided at the same level as the distance from the rotation axial center to the outermost peripheral surface of the holding plate 230. Note that the stopper member 240 needs to have a dimension of the outer peripheral surface away from the rotation center set so as not to hinder the rotation of the drive shaft 25.

Further, as illustrated in FIG. 11 and FIG. 12, the holding pin 250 is attached to the holding plate 230. The holding pin 250 is attached by inserting its one end into an attachment hole 231a formed to be vertical to the rotation plate part 231 in a hollow disk shape of the holding plate 230. Therefore, the holding pin 250 rotates integrally with the holding plate 230. The holding pin 250 fits into the above holding concave part 241 to maintain the state in which the stopper member 240 is housed in the stopper housing part 223. The holding pin 250 can fit to and separate from the holding concave part 241 in the play gap part 223b. Accordingly, the holding plate 230 is regulated in relative rotation with respect to the stopper support member 220 according to the size of the gap between the holding pin 250 in the play gap part 223b and the stopper support member 220, but may be regulated in relative rotation by contact between the peripheral wall part 233 and the stopper support member 220 as explained above.

Note that the holding pin 250 corresponds to part of the holding means and is integral with the rotation plate part 231 in the hollow disk shape and the peripheral wall part 233.

Further, the rotation lock device (cargo fall prevention) 200 is provided with an urging unit 260 so as to maintain the state in which the stopper member 240 is housed in the stopper housing part 223 by the holding pin 250 fitting into the holding concave part 241 when the stopper member 240 is housed at the predetermined position of the stopper housing part 223. Note that as illustrated in FIG. 11, the urging unit 260 is arranged on the side of the loosely fit part 234 opposite to the opening 235 in this embodiment, but may be arranged at any position as long as the state in which the stopper member 240 is housed in the stopper housing part 223 can be maintained.

Note that the urging unit 260 is configured similarly to the urging unit 150 in the above first embodiment. Specifically, the urging unit 260 has an urging spring 261 similar to the urging spring 151 and a one-end hooking pin 262 similar to the one-end hooking pin 152. In addition, the urging unit 260 has another-end hooking pin 263.

The other-end hooking pin 263 is a member which is attached by being inserted into an attachment hole 231b formed in the rotation plate part 231 of the holding plate 230 and on which the other end side of the urging spring 261 is hooked.

Here, the point of action of the one-end hooking pin 262 where the urging spring 261 is hooked and the point of action of the other-end hooking pin 263 where the urging spring 261 is hooked are different by a predetermined angle θ with respect to the rotation center. Accordingly, the urging spring 261 applies an urging force so as to decrease the angle θ. Note that the urging force is an urging force in a direction of bringing the holding pin 250 into contact with the holding concave part 241.

Figure 14:
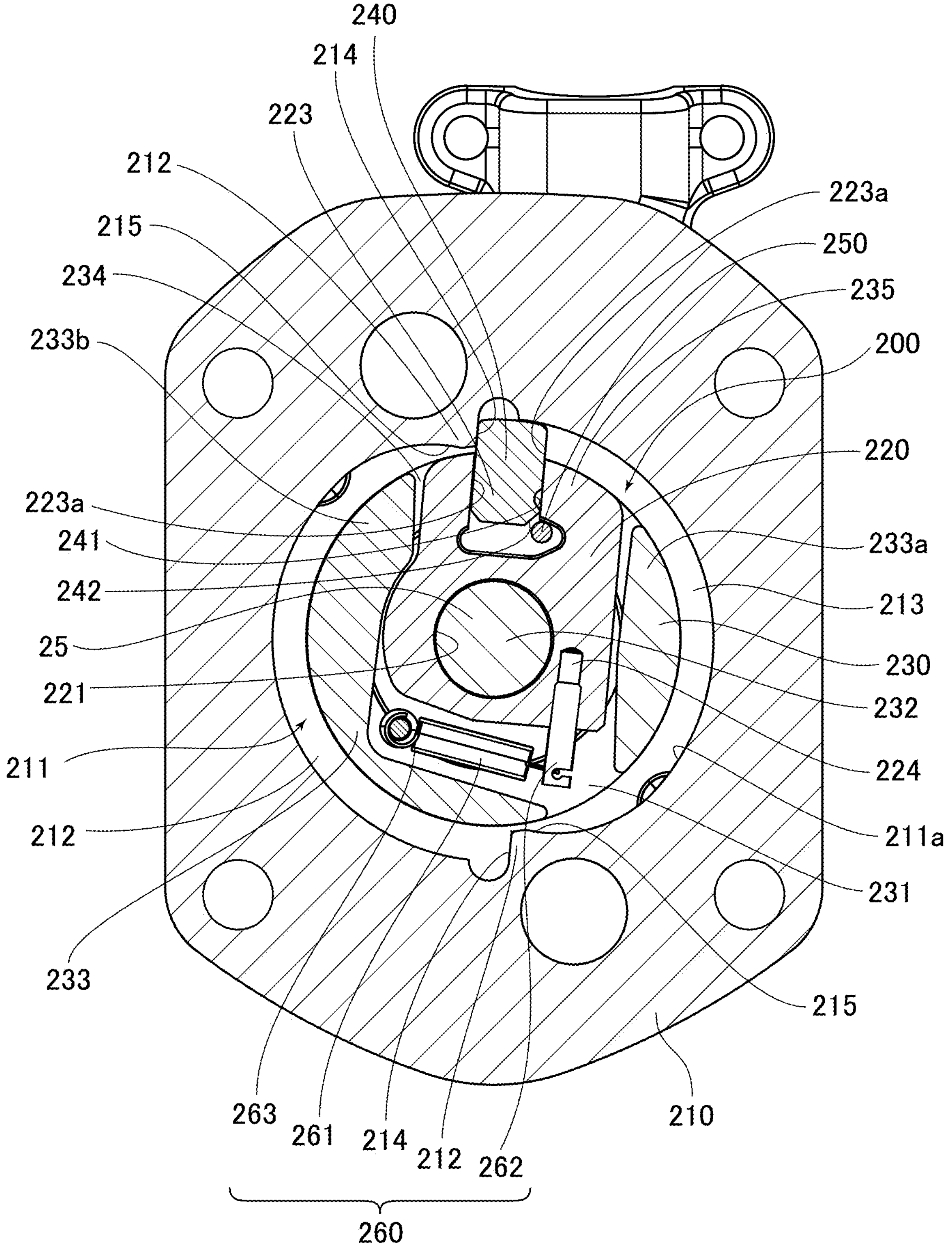
FIG. 14 is a cross-sectional view illustrating a state in which the rotation lock (cargo fall prevention) device operates in a cross-section of the device illustrated in FIG. 11.
Figure 15:
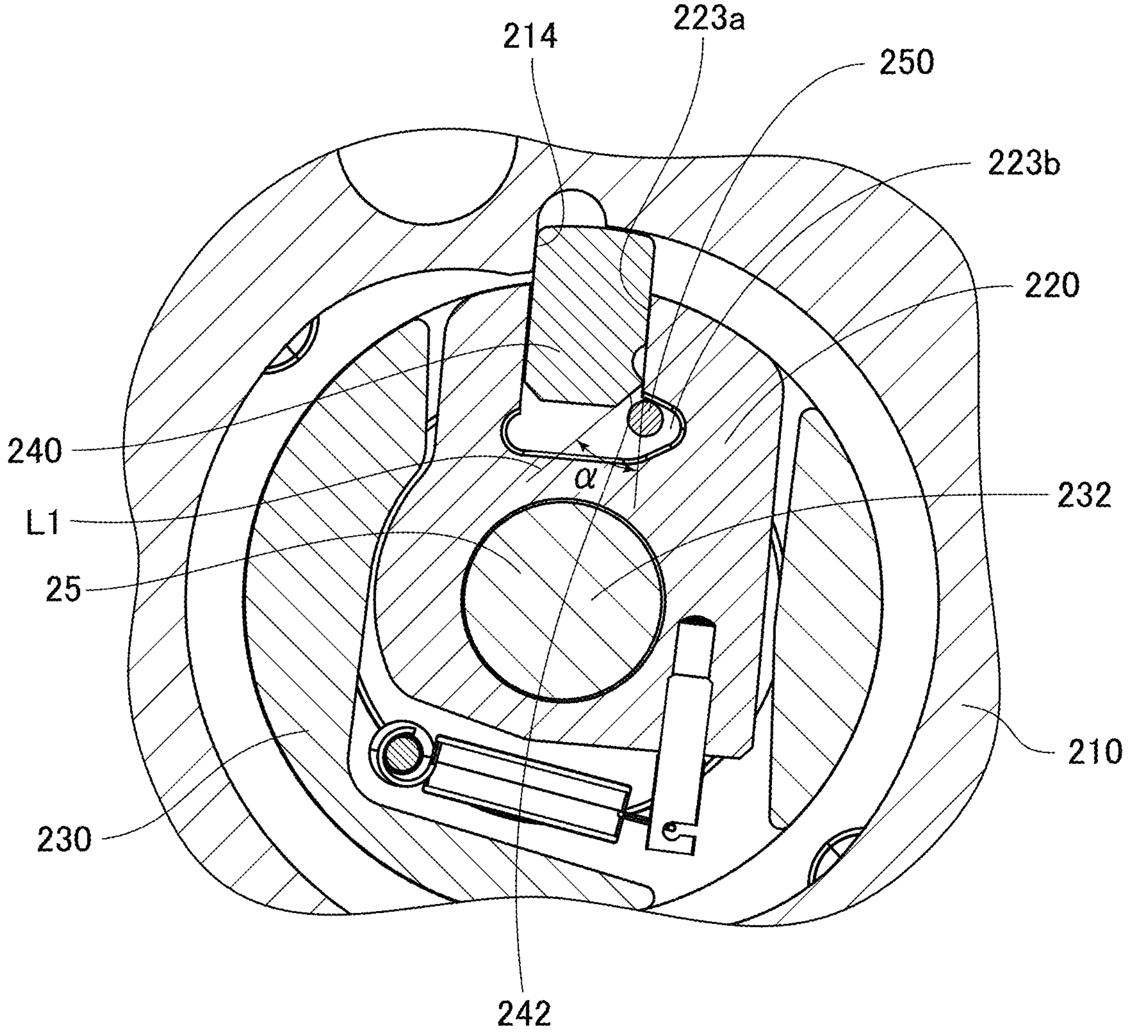
FIG. 15 is an enlarged view illustrating the vicinity of a stopper member in FIG. 14.

Note that FIG. 14 is a view illustrating a state in which the stopper member 240 projects to the locking concave part 213 and comes into contact with the locking wall 214, namely, a state in which the rotation lock device 200 operates to lock the rotation of the drive shaft 25. FIG. 15 is an enlarged view illustrating the vicinity of the stopper member 240 in FIG. 14. As illustrated in FIG. 6 and FIG. 7, an inclined surface 242 coming into contact with the holding pin 250 is provided at the lower end of the stopper member 240. A tangent L1 of the inclined surface 242 forms an angle α with respect to the side wall 223a. The angle α is preferably 45 degrees or near 45 degrees, but may be another inclination angle. {0151}

<Regarding the Operation>

A case where the drive shaft 25 starts the accelerated rotation in the lowering direction by a tensile force applied to the chain C1 due to a suspended load because the brake device 70 is broken in the hoisting operation of the lever hoist 10 in the rotation lock (cargo fall prevention) device 200 having the above configuration is considered.

First, the drive shaft 25 and the stopper support member 220 that have lost the brake force undergo a rapid increase in rotation speed in the one rotation direction (lowering direction) being the counterclockwise direction in FIG. 11 together with the stopper member 240 due to the tensile force applied to the chain C1. In this event, the urging force of the urging spring 261 acts to make the holding means (the holding plate 230 and the holding pin 250) follow the rotation of the stopper member 240. However, the pressing force of the holding pin 250 pressing the holding concave part 241 of the stopper member 240 is first offset by the inertial force acting on the holding means (the holding plate 230 and the holding pin 250). Further, when the drive shaft 25 rotates with acceleration together with the stopper support member 220 and the stopper member 240 at an acceleration exceeding the followable acceleration, the holding means (the holding plate 230 and the holding pin 250) cannot follow the rotation, and the holding pin 250 of the holding means (the holding plate 230 and the holding pin 250) starts to separate from the holding concave part 241 of the stopper member 240. Further, when the acceleration rotation is continued, the holding pin 250 completely separates from the holding concave part 241 to release the engagement between the holding pin 250 and the holding concave part 241. The stopper member 240 that has lost the holding force by the holding means (the holding plate 230 and the holding pin 250) becomes capable of projecting from the stopper housing part 223 of the stopper support member 220 toward the inner wall surface 211*a* of the locking plate 210. Then, the stopper member 240 slides in the centrifugal direction by the centrifugal force acting on the stopper member 240 and a tip side of the stopper member 240 runs into the locking concave part 213 with a not-illustrated centrifugal means by a spring or the like urging the stopper member 240 in the centrifugal direction or without the centrifugal means by the spring as illustrated in FIG. 11.

In the above manner, the stopper member 240 enters the locking concave part 213. Then, after the entry, one side surface of the stopper member 240 collides with the locking wall 214 in a state in which the stopper member 240 is supported by the stopper support member 220. This stops the rotation in the one rotation direction (lowering direction) of the stopper support member 220 and the drive shaft 25 to stop a fall of the cargo.

Further, after the stop of the drive shaft 25, the holding pin 250 press-urges the rear end of the stopper member 240 so as to prevent the stopper member 240 from improperly returning to the stopper housing part 223, and maintains the engagement between the stopper member 240 and the locking wall 214.

On the other hand, a case where the brake device 70 is broken and a relatively light cargo is hoisted is considered. In this event, though a rapid fall of the cargo does not occur owing to the resistance of the internal mechanism of the lever hoist 10, the rotation speed of the drive shaft 25 gradually increases.

In this case, first, the drive shaft 25 and the stopper support member 220 that have lost the brake force undergo an increase in rotation speed in the lowering direction (the one rotation direction being the counterclockwise direction in FIG. 11) together with the stopper member 240 due to the tensile force applied to the chain C1. In this event, the urging force of the urging spring 261 acts to make the holding means (the holding plate 230 and the holding pin 250) follow the rotation of the stopper member 240. Then, when the stopper member 240 starts rotation with acceleration together with the stopper support member 220 and the drive shaft 25 but does not reach the acceleration exceeding the acceleration accelerated in the direction following the holding means, the holding means (the holding plate 230 and the holding pin 250) follow the rotation, so that the engagement between the holding pin 250 and the holding concave part 241 is not released, resulting in continuing the holding. However, the pressing force of the holding pin 250 pressing the holding concave part 241 of the stopper member 240 decreases by the rotation acceleration.

Further, when the continuation of the acceleration rotation increases the rotation speed of the drive shaft 25 and the centrifugal force acting on the stopper member 240 exceeds the holding force by the pressing force of the holding pin 250 pressing the holding concave part 241, the stopper member 240 projects from the holding position toward the inner wall surface 211*a*. Then, the side surface of the stopper member 240 collides with the locking wall 214, and the stopper support member 220 stops the rotation together with the drive shaft 25.

Next, a state in which the brake device 70 is normally operating is considered. The lever hoist 10 generally includes an idle mechanism specific to the lever hoist 10. In the state in which the idle mechanism operates, the brake force of the brake device 70 is temporarily made not to act so that the chain C1 can be pulled by hand by the operator to adjust the length of the chain C1 at a faster speed than it can be operated by lever operation. However, for safety, the brake device 70 is configured to act to stop the rotation of the drive shaft 25 when a predetermined tensile force acts in the lowering direction. On the other hand, in the brake device 70 having the ratchet wheel 80 employed in the lever hoist 10, the brake does not work in the hoisting direction, thus making it possible to adjust the length of the chain C1 at a speed higher than that in the lowering direction. In the lever hoist 10 in this state, the rotation lock (cargo fall prevention) device 200 also has better workability in a case where it does not act in the hoisting direction (other rotation direction) as much as possible.

In a case where the operator pulls the chain C1 in the hoisting direction, the load sheave 20 rotates in the hoisting direction, and the drive shaft 25, the stopper support member 220, and the stopper member 240 also rotate in the hoisting direction. In this event, the holding concave part 241 of the stopper member 140 presses the holding pin 250 of the holding means in the hoisting direction, so that the holding force for holding the stopper member 240 does not decrease. Accordingly, the holding force for holding the stopper member 240 differs depending on the rotation direction of the drive shaft 25. In other words, conditions such as the number of rotations of the drive shaft 25 at which the stopper member 240 projects in the centrifugal direction from the predetermined position of the stopper housing part 123 can be separately set in the lowering direction and in the hoisting direction.

Figure 16:
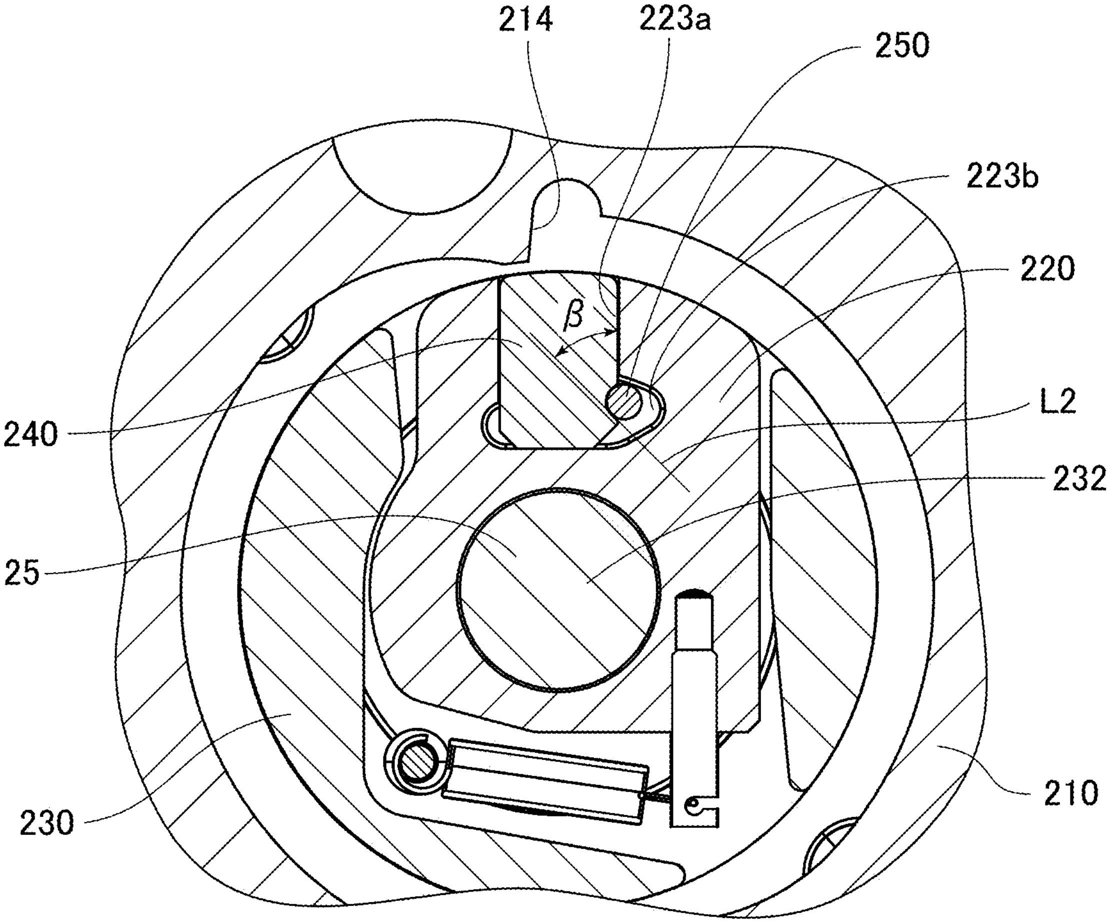
FIG. 16 is an enlarged view illustrating the vicinity of the stopper member in FIG. 11.

FIG. 16 is an enlarged view illustrating the vicinity of the stopper member 240 in FIG. 11. The holding force for holding the stopper member 240 at the predetermined position of the stopper support member 220 is decided by an angle θ formed between the side wall 223*a* of the stopper housing part 223 and a tangent L2 where the holding concave part 241 and the holding pin 250 are in contact, in addition to the pressing force of the holding pin 250. In more detail, in the case where the angle θ formed between the side wall 223*a* slidably guiding the stopper member 240 and the tangent L2 where the holding concave part 241 and the holding pin 250 are in contact is 90 degrees or more, even if the pressing force by the holding pin 250 is small, the stopper member 240 never projects out in the centrifugal direction. Besides, in the case where the angle θ formed between the side wall 223*a* and the tangent L2 is about 45 degrees, if the centrifugal force at the same level as the pressing force of the holding pin 250 acts, the stopper member 240 comes to project out in the centrifugal direction against the pressing force.

Accordingly, it becomes possible to make the rotation lock device 200 not operate even when the rotation speed of the drive shaft 25 is high speed but operate only when the acceleration of the rotation of the drive shaft 25 reaches a predetermined value or more, by appropriately setting the shapes of the holding pin 250 and the holding concave part 241 and the positional relation between them so that the angle β formed between the side wall 223*a* and the tangent L2 becomes 90 degrees or more. On the other hand, when it is desired to make the rotation lock device 200 operate when exceeding the predetermined rotation speed, the formed angle β is set to less than 90 degrees, practically to equal to or less than 75 degrees. Note that when the cross-sectional shape of the holding pin 250 is a circle as illustrated in FIG. 11 and FIG. 16, the angle varies depending on the fitting depth in the holding concave part 241 up to a range of a radius of the holding pin 250, so that the holding force varies. Further, even if the angle β formed with respect to the tangent L2 is 0 degree, the holding force can be obtained by selecting a configuration of causing a predetermined frictional force.

As illustrated in FIG. 14 and FIG. 16, the stopper member 240 is held to project to the outer diameter side by a component force of the pressing force of the holding pin 250 by the inclined surface 242. When the stopper member 240 is pressed in the axial center direction by a force exceeding the component force of the pressing force, the stopper member 240 is pushed back. When the drive shaft 25 is rotated in the hoisting direction by the operation lever 50, the stopper member 240 separates from the locking wall 214, and the tip end portion of the stopper member 240 comes into contact with the tapered wall 215 provided on the side opposite to the locking concave part 213. When the drive shaft 25 is further rotated in the hoisting direction, the tip of the stopper member 240 is pressed by the tapered wall 215 and pushed back in the axial center direction. During this period, the holding pin 250 continues to press the side wall of the stopper member 140. When a contact point of the holding pin 250 and the stopper member 240 moves to the holding concave part 241, the component force of the pressing force of the holding pin 250 slides the stopper member 240 in the axial center direction and holds it at the predetermined position.

Note that as illustrated in FIG. 14 and FIG. 15, the locking wall 214 is set to be parallel with the side wall 223*a* of the stopper housing part 223 in a state in which the stopper member 240 is in contact with the locking wall 214. Accordingly, the component force for pushing the stopper member 240 back in the axial center direction due to the pressing force received from the locking wall 214 is not generated.

<Regarding the Effect>

In the case of the above configuration, the same effect as that of the above rotation lock (cargo fall prevention) device 100 according to the first embodiment can be produced.

Further, in this embodiment, the holding plate 230 of the holding means has the rotation plate part 231 in the disk shape, the rotation plate part 231 has the bearing hole (center hole 232) pivotally supported to be rotatable around the axial center of the drive shaft 25, and the stopper support member 220 and the rotation plate part 231 are coupled by the urging spring 261 (urging means).

With the above configuration, the holding means can smoothly relatively rotate coaxially with the stopper support member 220 and has a simple structure, thus enabling downsizing of the rotation lock (cargo fall prevention) device 200. Further, the assembly performance becomes excellent. Note that the bearing hole (center hole 132) is pivotally supported at the outer periphery of the bearing boss part 222 of the stopper support member 220, but may be directly pivotally supported by the drive shaft 25 (shaft-shaped member).

Further, in this embodiment, the side surface of the stopper member 240 on the side opposite to the side surface in the first rotation direction (side surface on the right of the stopper member 240 in FIG. 3) is provided with the holding concave part 241 engaging with the holding pin 250. With this configuration, it is possible to accurately set an operation threshold value for the stopper member 240 to project, more surely than the holding by a frictional force of the like between the holding pin 250 and the stopper member 240.

Further, in this embodiment, the locking plate 210 (stopper locking means) includes: the insertion hole 211 configured to make the stopper support member 220 rotatable around the axial center of the drive shaft 25 (shaft-shaped member); the locking concave part 213 which is concave from the inner wall 211*a* of the insertion hole 211 toward the outer diameter side and which the stopper member 240 projecting from the outer periphery of the stopper support member 220 enters; and the locking wall 214 which is provided on the end portion side of the locking concave part 213 in the first rotation direction and configured to stop the rotation of the drive shaft 25 (shaft-shaped member) by the stopper member 240 coming into contact therewith.

With the above configuration, the attachment to the frame 12 in a flat-plate shape which rotatably holds the drive shaft 25 (shaft-shaped member) becomes easier. Further, the arrangement of the stopper support member 220, the stopper member 240, and so on to the insertion hole 211 makes it possible to surely and easily separate the operation portion as the rotation lock (cargo fall prevention) device 200 from the external part.

Further, in this embodiment, the locking plate 210 (stopper locking means) has the tapered wall 215 (engagement release wall) gradually projecting toward the axial center as going toward the end portion side of the locking concave part 213 in the second rotation direction being the opposite direction to the first rotation direction; and the tapered wall 215 (engagement release wall) pushes back the stopper member 240 from the projection position by rotating the drive shaft 25 (shaft-shaped member) in the second rotation direction in the state in which the stopper member 240 is kept in contact therewith.

With the above configuration, the stopper member 240 once moved in the centrifugal direction from the predetermined position of the stopper support member 220 can be pushed back to the predetermined position only by rotating the drive shaft 25 (shaft-shaped member) in the other rotation direction (hoisting direction) without disassembling the rotation lock (cargo fall prevention) device 200 (lever hoist 10).

Modification Example

Embodiments of the present invention have been explained above, and the present invention is variously modifiable. Hereinafter, those modifications will be explained.

In each of the above embodiments, the case where the rotation lock (cargo fall prevention) device 100 is applied to the lever hoist 10 is explained. However, the above rotation lock (cargo fall prevention) device may be applied to a hoisting machine other than the lever hoist, such as a chain block, or a lift device in which the direction of a load is fixed as in the hoisting machine.

Further, in the above first and second embodiments, the stopper members 140, 240 are configured to be movable in the circumferential direction with respect to the holding plates, 130, 230 as illustrated, for example, in FIG. 7 to FIG.

9 and FIG. 14 to FIG. 16. Further, the stopper support members 120, 220 and the holding plates, 130, 230 are coupled via the urging units 150, 260. However, the present invention is not limited to the configuration. As illustrated, for example, in FIG. 17 and FIG. 18, holding balls 133, 252 like iron balls correspond to the holding means, housing recessed parts 125, 225 which house the urging springs 151, 261 corresponding to the urging means are provided at the stopper support members 120, 220, and the holding balls 133, 252 urged by the urging springs 151, 261 are configured to engage with the holding concave parts 144, 241 of the stopper members 140, 240. Further, the stopper members 140, 240 are brought into a state of being urged at all times to the outer diameter side by centrifugal urging springs 160, 270. Further, on the side surfaces of the stopper members 140, 240 on the side opposite to the holding concave parts 144, 241, protruding parts 145, 243 for preventing slip-off are provided. Further, on the side of the stopper support members 120, 220 closer to the outer diameter than the center holes 121, 221, retaining recessed parts 126, 226 which the protruding parts 145, 243 enter to function as slip-off preventions are provided. Further, the holding means may be a roller shape, a prism, or a columnar body with a polygonal cross-section, in addition to the iron balls like the holding balls 133, 252.

Even with the above configuration, when the drive shaft 25 (shaft-shaped member) exceeds the predetermined acceleration in the one rotation direction as in the above rotation lock (cargo fall prevention) device 100, 200, the rotation lock (cargo fall prevention) device 100, 200 can operate to stop the rotation. Further, even if the stopper member 140 projects out to the outer diameter side, the protruding part 145 does not come off the retaining recessed part 126, thereby preventing the stopper member 140 from coming off the stopper housing part 123. This eliminates the need to arrange the stopper support member 120 over the entire circumference of the stopper support member 120 so as to prevent the stopper member 140 from coming off the stopper housing part 123. Accordingly, for example, a pair of stopper locking members 110 can be provided, and the large space SP1 can be formed between the pair of stopper locking members 110. Further, it also becomes possible to reduce the weight of the pair of stopper locking members 110.

Further, the rotation lock (cargo fall prevention) device 100, 200 is exemplified to be arranged on the drive shaft 25 of the hoisting machine, but its attachment position is not limited to the drive shaft, and the rotation lock (cargo fall prevention) device 100, 200 can be arranged on the shaft-shaped member which rotates integrally with the target rotation member such as a shaft portion of a load sheave or a winding drum. This can prevent the fall of the cargo even if a reduction mechanism is broken.

Figure 19:
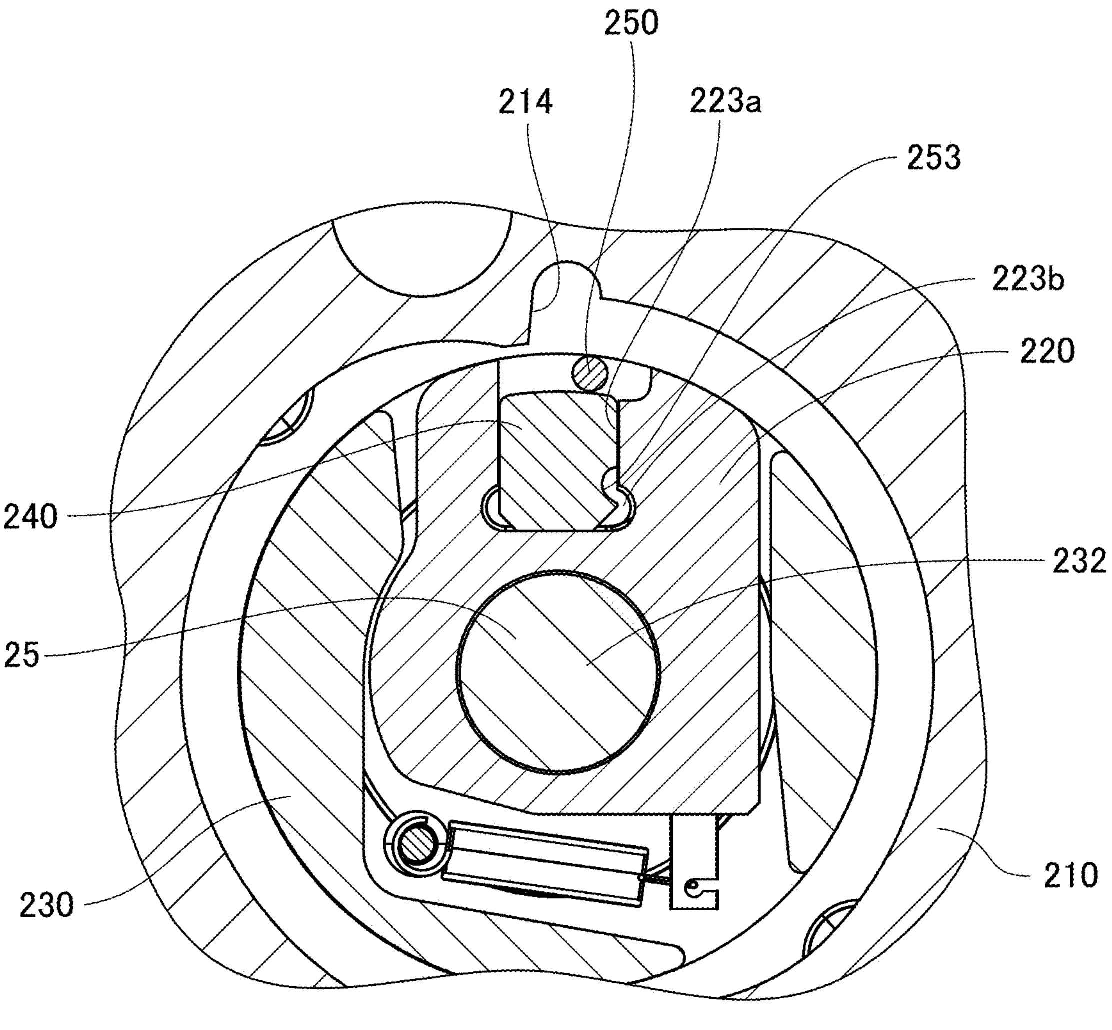
FIG. 19 relates to a modification example of the present invention and illustrates another method of engaging a holding pin and the stopper member.
Figure 20:
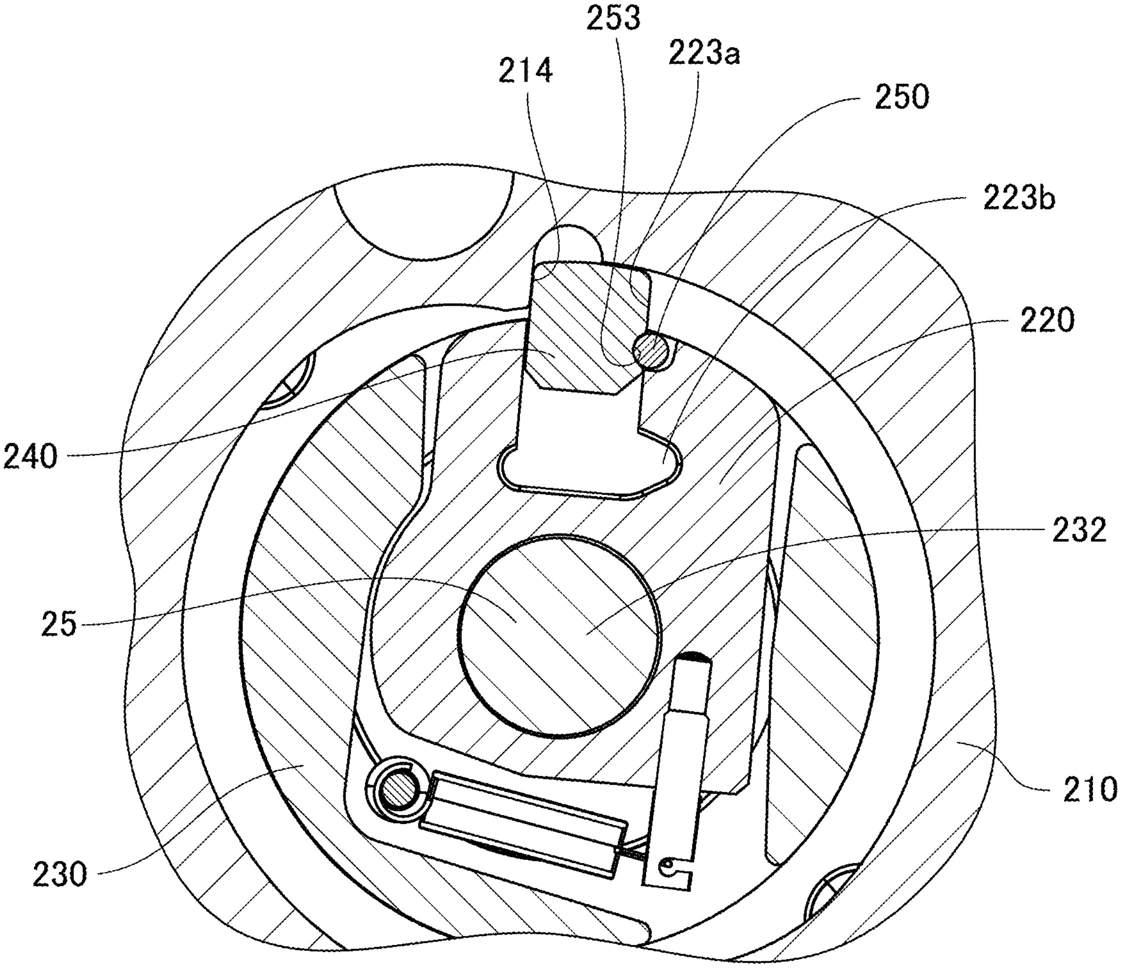
FIG. 20 is a view illustrating a state in which the stopper member projects from the state illustrated in FIG. 19 and engages with a locking wall.

FIG. 19 is a view illustrating a modification example relating to the method of engaging the holding pin 250 and the stopper member 240. Besides, FIG. 20 is a view illustrating a state in which the stopper member 240 projects from the state illustrated in FIG. 19 and engages with the locking wall 214. In the state illustrated in FIG. 19, the holding pin 250 is located in a manner to cover the tip of the stopper member 240. When the stopper support member 220 rotates with sudden acceleration in the lowering direction from this state, the holding pin 250 cannot follow but is left and thereby released from the engagement with the tip end surface of the stopper member 240. Then, the stopper member 240 can project to the locking concave part 213. Then, when the stopper member 240 projects as illustrated in FIG. 20, the locking wall 214 and the stopper member 240 engage with each other to lock the rotation. In this event, the holding pin 250 engages with a return regulation concave part 253 formed on the side surface of the projecting stopper member 240 by the urging force of the urging unit 260 and thereby can regulate an improper return of the stopper member 240.

Figure 21:
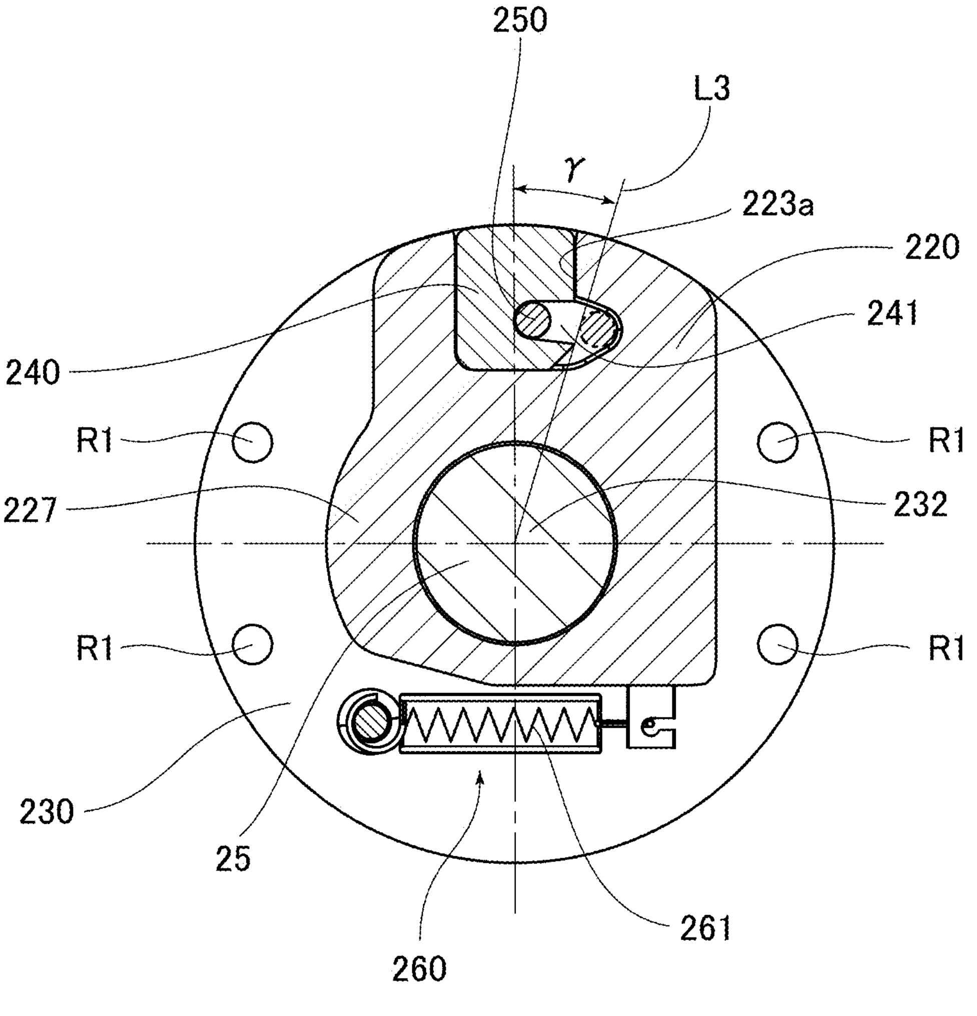
FIG. 21 is a front view illustrating a modification example of a holding means.
Figure 22:
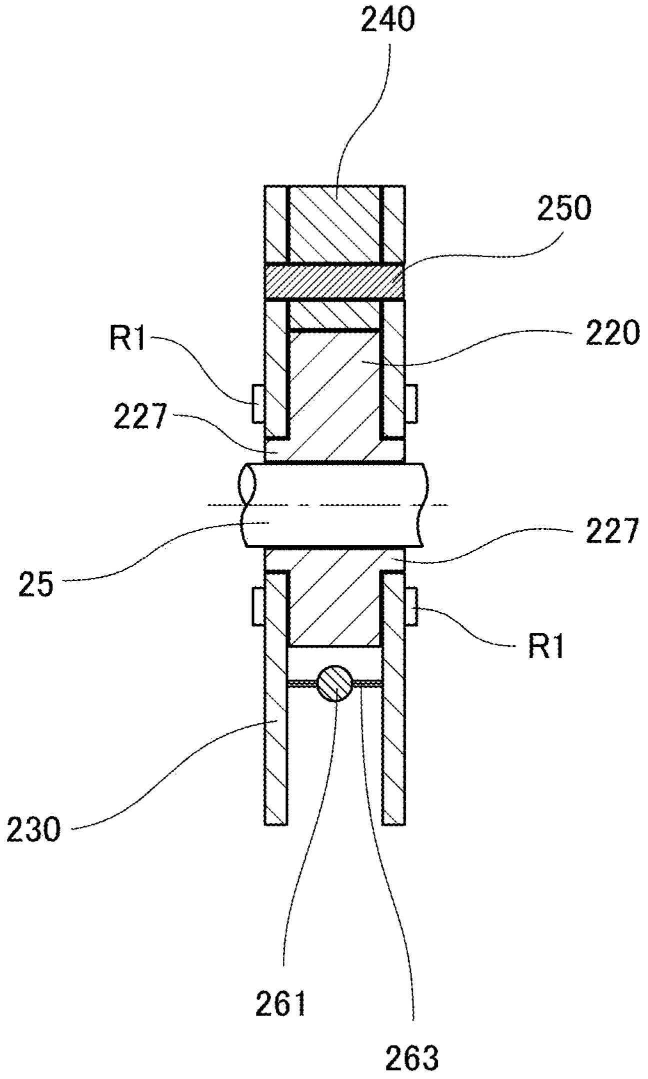
FIG. 22 is a side cross-sectional view of the holding means illustrated in FIG. 21.

FIG. 21 is a front view illustrating a modification example of the holding means, and FIG. 22 is a side cross-sectional view of the holding means illustrated in FIG. 21. In the configuration illustrated in FIG. 21 and FIG. 22, two holding plates 230 are provided, and the two holding plates 230 are configured to sandwich the stopper support member 220 and the stopper member 240 therebetween. Note that the two holding plates 230 are coupled by the coupling member R1, and the two holding plates 230 are integrally coupled by the coupling member in a state of having a predetermined interval therebetween.

Further, as illustrated in FIG. 22, both end portions of the holding pin 250 are supported by the two holding plates 230. The two holding plates 230 are pivotally supported to be rotatable at the outer periphery of a boss part 227 of the stopper support member 220. The stopper support member 220 and the holding plate 230 are coupled by the urging unit 260, and the urging unit 260 urges the holding plate 230 to rotate in the lowering direction with respect to the stopper support member 220. More specifically, when the stopper support member 220 rotates in the lowering direction, the holding plate 230 is urged in a direction following the rotation by the urging unit 260. Note that the holding pin 250 and the coupling member R1 may be integrally configured, but in the configuration illustrated in FIG. 21 and FIG. 22, the holding pin 250 and the coupling member R1 are separately provided. Further, four coupling members R1 are provided. Alternatively, the holding pin 250 and the other-end hooking pin 263 may also serve the function of the coupling member R1.

A brake device employed in the lever hoist and the chain block is composed of the brake device 70 including the ratchet wheel 80 and the pawl member 90. The brake device 70 acts the brake force only in the lowering direction, but the ratchet wheel 80 runs idle to lower because the brake force does not act in a range of a predetermined angle (pitch angle) decided by the number of ratchet teeth 83 thereof. Therefore, when the rotation lock device 200 is attached coaxially with the brake device 70, the rotation lock device 200 may work earlier than the brake device 70. However, the rotation lock device 200 is an emergency brake and is not preferable to regularly operate. Hence, the rotation lock device 200 is made to operate later than the brake device 70 in the modification example illustrated in FIG. 21 and FIG. 22.

In other words, the ratchet wheel 80 runs idle in the lowering direction by an angle (pitch angle) obtained by dividing one circumference by the number of teeth at most when the hoisting operation is interrupted in the middle of the operation. This angle is assumed to be the angle $\gamma$ illustrated in FIG. 20. In this case, it is preferable form that the rotation lock device 200 also operates with a delay of an angle larger than the angle $\gamma$. To this end, in a housing state of the stopper member 240, the depth of the holding concave part 241 engaging with the holding pin 250 is made deeper by at least the angle $\gamma$. In addition, it is preferable to maintain the holding of the stopper member 240 until the holding plate 230 relatively rotates by the angle $\gamma$ or more with respect to the stopper support member 220 in the second rotation direction opposite to the lowering direction with respect to the drive shaft 25 and the stopper support member 220.

The holding concave part 241 of the stopper member 240 is decided by a trajectory of the holding pin 250, and an outer-peripheral side inner wall of the holding concave part 241 is provided with a predetermined gap with respect to the trajectory, thus facilitating the production. Here, the delaying the operation of the rotation lock device 200 from the brake device 70 can be adjusted also by a spring pressure of the urging spring 261 of the urging unit 260 in place of the depth of the holding concave part 241. Increasing the spring pressure of the urging spring 261 realizes the delay but, with a low load, a range where it does not operate even if the brake device 70 fails increases, so that it is preferable to perform the adjustment by the depth of the holding concave part 241 (the angle formed by the holding concave part 241 around the axial center of the drive shaft 25).

Further, in the first embodiment, the guide groove 136 in FIG. 5 to FIG. 10 may be omitted, the holding projection part 137 having the first regulation wall and the second regulation wall may be made to project from the holding plate 130 to the stopper member 140 side to control the operation of the stopper member 140 by the engagement with the stopper projection 141. In this case, it is only necessary to add a relative rotation regulating projection which regulates the relative rotation between the stopper support member 120 and the holding plate 130 to a predetermined range, to the holding plate in place of the inner wall **136*a*1. Further, the regulation of the projection out of the stopper member 140 in the centrifugal direction can be substituted by an inner wall surface 111*a* of the locking plate 110**.

Figure 17:
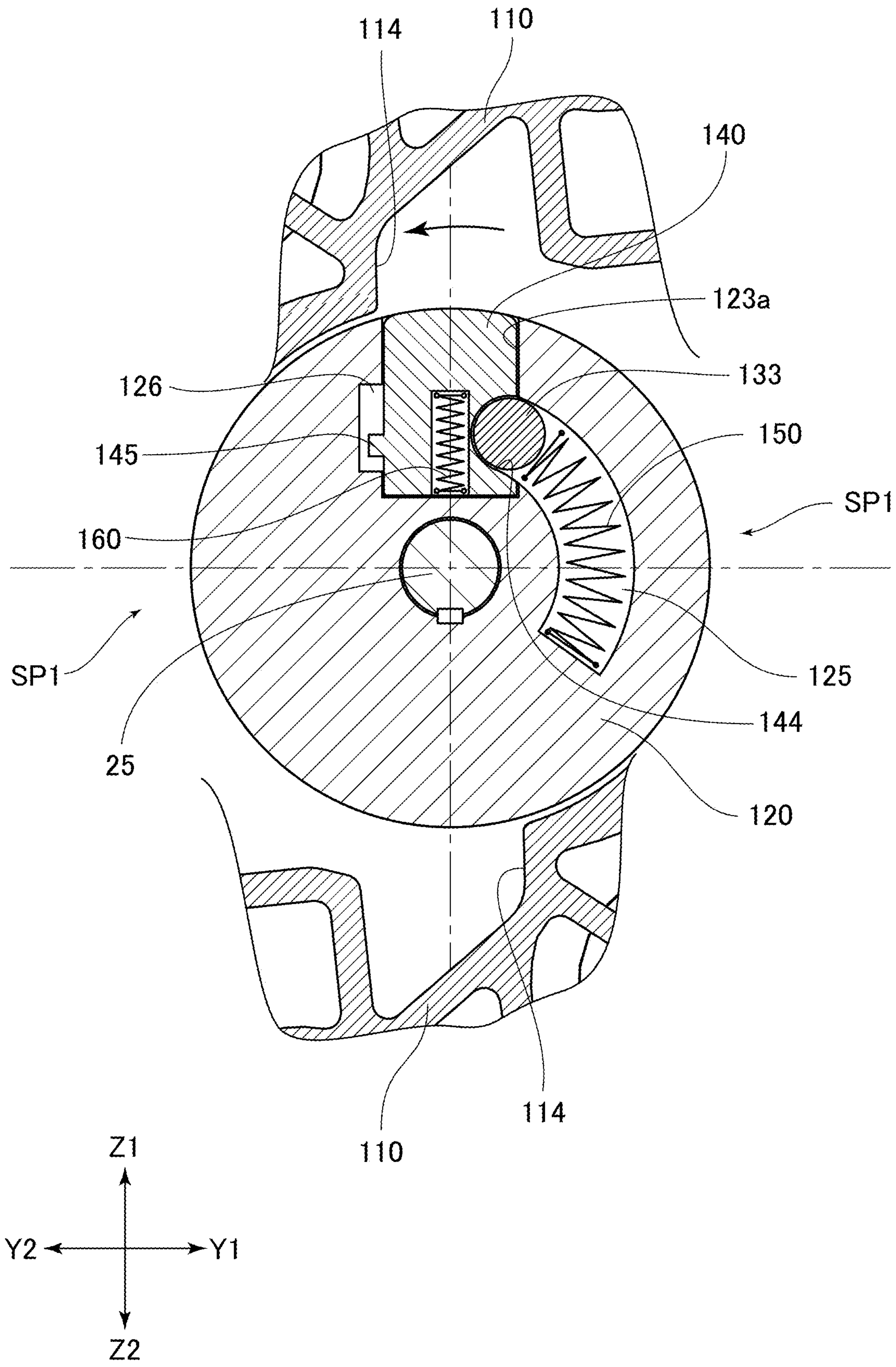
FIG. 17 is a cross-sectional view illustrating a schematic configuration of a rotation lock device according to a modification example of the present invention.
Figure 18:
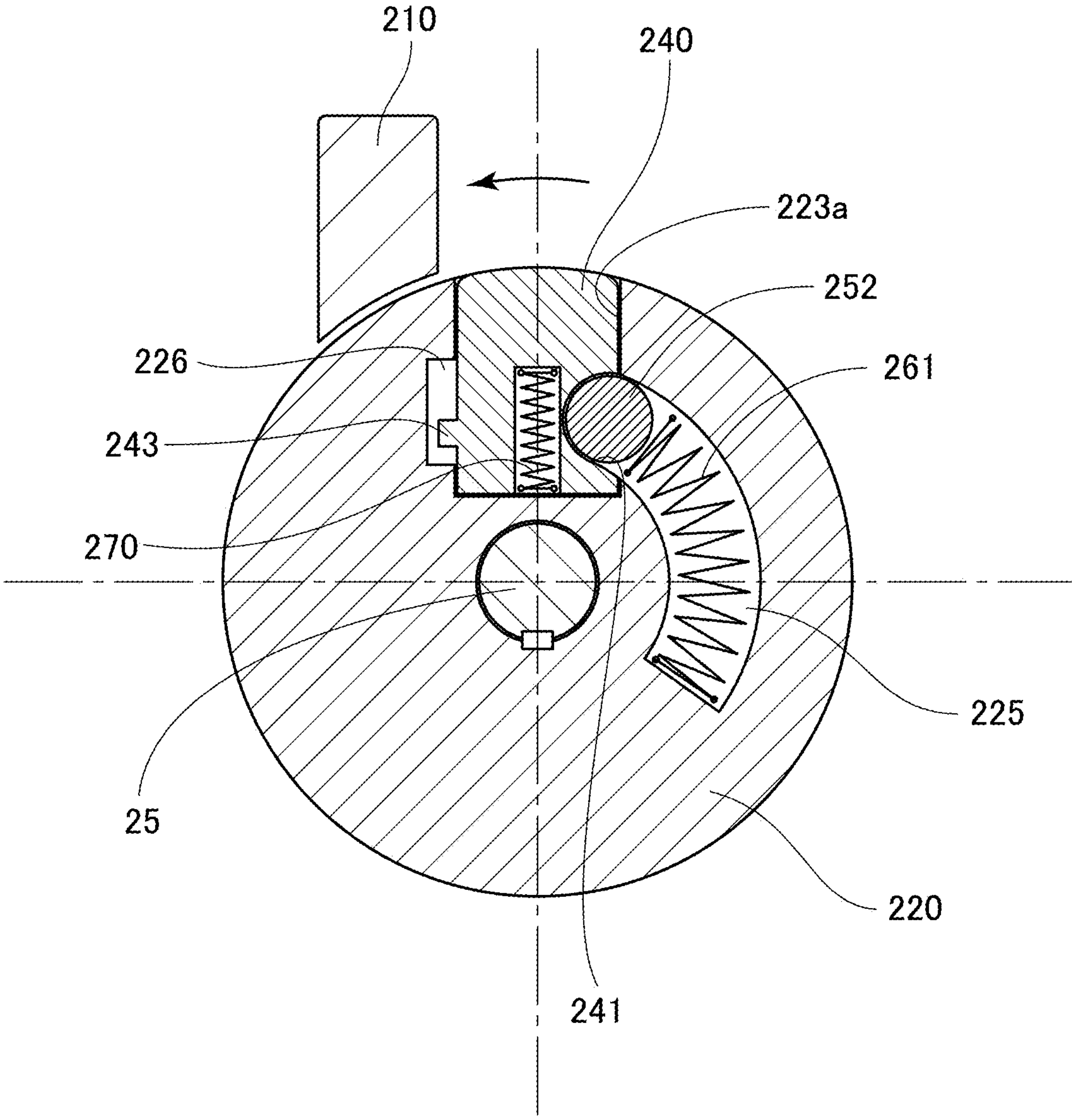
FIG. 18 is a cross-sectional view illustrating a schematic configuration of a rotation lock device according to another modification example of the present invention.

Further, though the effect is limited, the return regulation groove part **136*c* in FIG. 5 to FIG. 10 may be omitted and a centrifugal urging spring 160 as illustrated in FIG. 17 may be provided instead to prevent the stopper member 140 from returning to the original position when the rotation lock device operates, or only the return regulation groove part 136*c* is omitted but the centrifugal urging spring 160 does not have to be added depending on the specifications of the hoisting machine to which the rotation lock device is attached. Further, the return regulation groove part 136*c* is provided but the second regulation wall 136*c*1 may be omitted. In place of the second regulation wall 136*c*1 being the inclined wall, a wall surface in an arc shape around the axial center of the drive shaft 25 like the play gap groove part 136*b*** may be provided, or a combination of the inclined wall and the wall surface in an arc shape may be provided.

Furthermore, though not illustrated, a guide groove may be provided on the stopper member 140 side, and a guide pin engaging with the guide groove may be provided on the holding plate 130 side.

Two holding plates 130 are preferably arranged in a manner to sandwich the stopper support member 120 therebetween, but only one holding plate 130 may be configured to be adjacent to the stopper support member 120.

Two holding plates 130, 230 are preferably arranged to sandwich the stopper support member 120, 220 therebetween, but only one holding plate 130, 230 may be configured to be adjacent to the stopper support member 120, 220.

Figure 23:
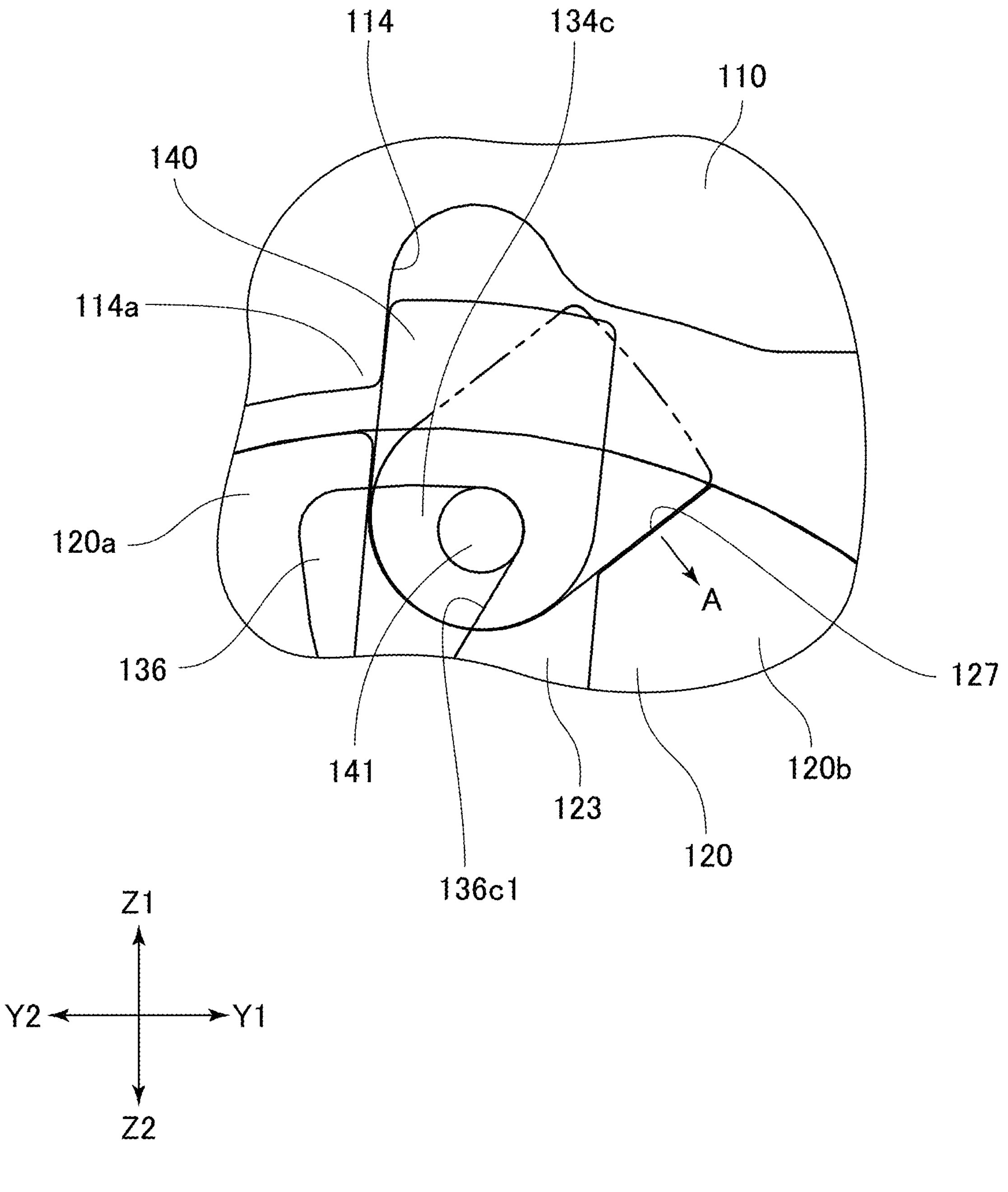
FIG. 23 relates to another modification example of the present invention in which an inclined wall is provided in the vicinity of an opening of the stopper housing part, and a view transparently illustrating a guide groove.

Further, the stopper member 140, 240 may be configured to fall down when the stopper member 140, 240 collides with the locking wall 114, 214. This configuration example is illustrated in FIG. 21. Note that FIG. 21 illustrates a case of applying the configuration to the rotation lock device 100 in the first embodiment, but the configuration may be applied to the rotation lock device 200 in the second embodiment. FIG. 23 relates to a modification example of the present invention in which an inclined wall 127 is provided in the vicinity of the opening of the stopper housing part 123, and a view transparently illustrating the guide groove 136. In the configuration illustrated in FIG. 23, the inclined wall 127 inclined with respect to the radial direction of the stopper support member 120 is provided on the one side (left side in FIG. 23; clockwise side) on the opening side of the stopper housing part 123.

In this configuration, when the stopper member 140 collides with the locking wall 114, the stopper member 140 turns (falls down) in the clockwise direction with the stopper projection 141 as a fulcrum. Then, the stopper member 140 collides with the inclined wall 127, whereby the turn of the stopper member 140 is stopped. In this event, the stopper member 140 is sandwiched between a corner part **114*a* of the locking wall 114 and the inclined wall 127. In this event, the stopper member 140 applies a force in an arrow A direction to the inclined wall 127. The direction of the force of the arrow A is inclined with respect to the circumferential direction of the stopper support member 120. Accordingly, a force along the circumferential direction does not act on the wide piece part 120*b***.

Here, as is clear from FIG. 4, the thickness dimension in the circumferential direction of the wide piece part **120*b* is smaller than the dimension in the arrow A direction in FIG. 23. Accordingly, even if the stopper member 140 collides with the locking wall 114, the direction of the force to be applied to the wide piece part 120*b* is changed from the circumferential direction to the arrow A direction because of the existence of the inclined wall 127. Therefore, the strength of the stopper support member 120 against the impact at the time of collision of the locking wall 114 with the stopper member 140** can be improved.

Further, in the above first embodiment, the stopper support member 120 has the arc bottom surface **123*b*, and the stopper member 140 has the arc surface 143 corresponding to the arc bottom surface 123*b*. However, the stopper support member 120 may have a square bottom surface other than the arc bottom surface 123*b*, and may be in an intermediate shape having a corner portion of the square bottom surface made into an R shape. Further, the arc surface 143 corresponding to the arc bottom surface 123*b*** may have a square surface, and may be in an intermediate shape having a corner portion of the square surface made into an R shape.

Further, the configuration of the above rotation lock (cargo fall prevention) device 100 according to the first embodiment may be applied to the rotation lock (cargo fall prevention) device 200 according to the second embodiment and, vice versa, the configuration of the above rotation lock (cargo fall prevention) device 200 according to the second embodiment may be applied to the rotation lock (cargo fall prevention) device 100 according to the first embodiment. For example, in the rotation lock (cargo fall prevention) device 200 according to the second embodiment, the pair of stopper locking members 110 (having the pawl shafts 115) of the rotation lock (cargo fall prevention) device 100 according to the first embodiment may be applied in place of the locking plate 210. Further, in the rotation lock (cargo fall prevention) device 100 according to the second embodiment, the locking plate 210 of the rotation lock (cargo fall prevention) device 200 according to the second embodiment may be applied in place of the pair of stopper locking members 110.

REFERENCE SIGNS LIST

10 . . . lever hoist, 11, 12 . . . frame, **12*a* . . . through hole, 12*b* . . . shaft hole, 13 . . . casing, 14** . . . brake cover,

14*a* . . . flange part, 14*a*1 . . . insertion hole, 15 . . . lock cover, 15*a* . . . rising part, 15*b* . . . opposed surface, 15*b*1 . . . passage hole, 20 . . . load sheave, 20*a* . . . insertion hole, 21 . . . load gear, 25 . . . drive shaft (corresponding to shaft-shaped member), 26 . . . male screw part, 27 . . . pinion gear, 30 . . . reduction gear, 31 . . . large-diameter gear part, 32 . . . small-diameter gear part, 34 . . . gear box, 35 . . . female screw member, 36 . . . female screw part, 37 . . . switching gear, 40 . . . switching claw, 45 . . . switching knob, 50 . . . operation lever, 55 . . . cam member, 60 . . . idling grip, 70 . . . brake device, 71 . . . brake receiver, 71*a* . . . flange part, 71*b* . . . hollow boss part, 72*a*, 72*b* brake plate, 80 . . . ratchet wheel (corresponding to part of ratchet mechanism), 83 . . . ratchet tooth, 90 . . . pawl member (corresponding to part of ratchet mechanism), 91 . . . pawl shaft, 92 . . . bush, 93 . . . torsion spring, 93*a* . . . coil part, 100, 200 . . . rotation lock (cargo fall prevention) device, 110 . . . stopper locking means (corresponding to stopper locking means), 111 . . . attachment hole, 111*a* . . . inner wall surface, 112, 212 . . . inner protruding part, 113 . . . recessed part, 114, 214 . . . locking wall, 114*a* . . . corner part, 115 . . . pawl shaft (corresponding to part of ratchet mechanism), 116 . . . rib, 120, 220 . . . stopper support member, 120*a* . . . narrow piece part, 120*b* . . . wide piece part, 121, 221 . . . center hole, 122, 222 . . . bearing boss part, 123, 223 . . . stopper housing part, 123*a*, 223*a* . . . side wall, 123*b* . . . arc bottom surface, 124, 224 . . . plug-in hole, 125, 225 . . . housing recessed part, 126, 226 . . . retaining recessed part, 127 . . . inclined wall, 130, 230 . . . holding plate (corresponding to part of holding means), 131 . . . hole part, 132, 232 . . . center hole, 133, 252 . . . holding ball (corresponding to holding means), 136 . . . guide groove, 136*a* . . . allowable groove part, 136*a*1 . . . inner wall, 136*b* . . . play gap groove part, 136*b*1 . . . first regulation wall, 136*c* . . . return regulation groove part, 136*c*1 . . . second regulation wall, 137 . . . holding projection part, 137*a* . . . projection tip part, 140, 240 . . . stopper member, 141 . . . stopper projection, 142 . . . outer peripheral surface, 143 . . . arc surface, 144, 241 . . . holding concave part, 145 . . . protruding part, 150, 260 . . . urging unit (corresponding to urging means), 151, 261 . . . urging spring, 152, 262 . . . one-end hooking pin, 160, 270 . . . centrifugal urging spring, 210 . . . locking plate (corresponding to stopper locking means), 211 . . . insertion hole, 211*a* . . . inner wall surface, 213 . . . locking concave part, 215 . . . tapered wall, 223*b* . . . play gap part, 227 . . . boss part, 231 . . . rotation plate part, 231*a*. 231*b* . . . attachment hole, 233 . . . peripheral wall part, 233*a* . . . first peripheral wall part, 233*b* . . . second peripheral wall part, 234 . . . loosely fit part, 235 . . . opening, 242 . . . inclined surface, 243 . . . protruding part, 250 . . . holding pin, 253 . . . return regulation concave part, 263 . . . other-end hooking pin, B1 . . . stay bolt (corresponding to fastening member), B1*a* . . . first step part, B1*b* . . . second step part, B1*c* . . . male screw part, C1 . . . chain, N1 . . . nut, R1 . . . coupling member, S1 . . . gap, SP1 . . . space, W . . . washer

The invention claimed is:

1. A rotation lock device comprising:

a stopper support attached to a shaft-shaped member and rotating integrally with the shaft-shaped member;

a stopper member supported by the stopper support in a state of being slidable outward from an axial center side of the shaft-shaped member;

a holder to hold the stopper at a predetermined position of the stopper support;

an urger to urge the holder toward a first rotation direction being one rotation direction with respect to the stopper; and a stopper lock to stop a rotation of the shaft-shaped member by engaging with the stopper, wherein when the shaft-shaped member accelerates the rotation toward the first rotation direction, a holding force for the stopper by the holder is decreased and/or released by an inertial load of the holder to cause the stopper to project from the predetermined position to a position where the stopper engages with the stopper lock to thereby stop the rotation of the shaft-shaped member.

2. The rotation lock device according to claim 1, wherein:

the holder has a holding plate in a disk shape and a holding pin;

the holding plate has a bearing hole pivotally supported to be rotatable around the axial center of the shaft-shaped member; and the stopper support and the holding plate are coupled by the urger.

3. The rotation lock device according to claim 2, wherein a first side surface of the stopper on a side opposite to a second side surface of the stopper on a travelling direction side of the first rotation direction has a holding concave part engaging with the holding pin.

4. The rotation lock device according to claim 3, wherein when the shaft-shaped member rotates with acceleration toward the first rotation direction, the holder relatively rotates in a direction opposite to the first rotation with respect to the shaft-shaped member against an urging force of the urger; and the holder holds the stopper at the predetermined position in the radial direction until an angle of the relative rotation exceeds a predetermined angle.

5. The rotation lock device according to claim 1, wherein the stopper lock comprises:

an insertion hole to make the stopper support rotatable around the axial center of the shaft-shaped member;

a locking concave part which is concave from an inner wall of the insertion hole toward an outer diameter side and which the stopper projecting from an outer periphery of the stopper support enters; and a locking wall which is on an end portion side of the locking concave part in the first rotation direction and configured to stop the rotation of the shaft-shaped member by the stopper coming into contact therewith.

6. The rotation lock device according to claim 5, wherein:

the stopper lock has an engagement release wall gradually projecting toward the axial center as going toward an end portion side of the locking concave part in a second rotation direction being an opposite direction to the first rotation direction; and the engagement release wall pushes back the stopper from a projection position by rotating the shaft-shaped member in the second rotation direction in a state in which the stopper is kept in contact therewith.

7. The rotation lock device according to claim 1, wherein:

the holder has a holding plate in a disk shape;

the holding plate has a bearing hole pivotally supported to be rotatable around the axial center of the shaft-shaped member;

the stopper support and the holding plate are coupled by the urger;

the stopper has a stopper projection projecting toward the holding plate;

the holding plate has a holding projection to engage with the stopper projection to hold the stopper at a predetermined position in a radial direction of the stopper support; and the holding projection has a first regulation wall with which the stopper engages at a predetermined position in the radial direction, and a second regulation wall with which the stopper member engages at a position where the stopper member projects to the outer diameter side from the predetermined position in the radial direction.

8. The rotation lock device according to claim 1, wherein the shaft-shaped member is integrally coupled to a load sheave around which a chain is wound.

9. A lever hoist comprising:

a load sheave which is pivotally supported by a pair of frames and around which a chain configured to hoist a cargo is wound;

a drive shaft coupled to the load sheave via a reduction gear;

a brake attached to the drive shaft; and an operation lever configured to perform a rotation drive operation on the load sheave in a hoisting direction and a lowering direction, wherein on an outer periphery of the drive shaft, a rotation lock is arranged; the rotation lock comprising:

a stopper support attached to a shaft-shaped member and rotating integrally with the shaft-shaped member;

a stopper supported by the stopper support in a state of being slidable outward from an axial center side of the shaft-shaped member;

a holder to hold the stopper at a predetermined position of the stopper support;

an urger to urge the holder toward a first rotation direction being one rotation direction with respect to the stopper; and a stopper lock to stop a rotation of the shaft-shaped member by engaging with the stopper, wherein when the shaft-shaped member accelerates the rotation toward the first rotation direction, a holding force for the stopper by the holder is decreased and/or released by an inertial load of the holder to cause the stopper to project from the predetermined position to a position where the stopper engages with the stopper lock to thereby stop the rotation of the shaft-shaped member, and the shaft-shaped member is the drive shaft; and the stopper lock is attached to the frame.

10. The lever hoist according to claim 9, wherein in the rotation lock, when the shaft-shaped member rotates with acceleration toward the first rotation direction, the holder relatively rotates in the direction opposite to the first rotation with respect to the shaft-shaped member against the urging force of the urger, and the holder holds the stopper at the predetermined position in the radial direction until the angle of the relative rotation exceeds the predetermined angle;

the brake includes a ratchet wheel having a plurality of ratchet teeth;

the drive shaft includes the rotation lock; and the predetermined angle is an angle obtained by dividing one circumference of the ratchet wheel by the number of ratchet teeth.

11. A hoisting machine having a frame in a plate shape, comprising:

a brake including a ratchet including: a ratchet wheel which is attached to a periphery of a shaft-shaped member and has a ratchet tooth on an outer peripheral side; a pawl which engages with the ratchet tooth; and a pawl shaft which pivotally supports a turn of the pawl, the ratchet being configured to allow a rotation in a hoisting direction of the ratchet wheel by engagement between the ratchet tooth and the pawl and to disallow a rotation in a lowering direction; and a rotation lock to lock a rapid rotation of the shaft-shaped member, the rotation lock comprising:

a stopper support attached to the shaft-shaped member and rotating integrally with the shaft-shaped member;

a stopper supported by the stopper support in a state of being slidable outward from an axial center side of the shaft-shaped member;

a holder to hold the stopper at a predetermined position of the stopper support;

an urger to urge the holder toward the lowering direction with respect to the stopper; and a stopper lock to stop a rotation of the shaft-shaped member by contact with the stopper, wherein when the shaft-shaped member accelerates the rotation toward the lowering direction, a holding force for the stopper by the holder is released by an inertial load of the holder to cause the stopper to project from the predetermined position to a position where the stopper engages with the stopper lock to thereby stop the rotation of the shaft-shaped member.

12. The hoisting machine according to claim 11, wherein each said stopper lock is integrated with the pawl shaft; and each said stopper lock is attached to the frame via a fastener.

13. The hoisting machine according to claim 11, wherein a pair of the stopper locks are at positions different in a circumferential direction of the shaft-shaped member, and a space is between one of the stopper locks and the other of the stopper locks.

14. The hoisting machine according to claim 11, wherein the holder has a holding plate in a disk shape;

the holding plate has a bearing hole pivotally supported to be rotatable around the axial center of the shaft-shaped member;

the stopper support and the holding plate are coupled by the urger;

the stopper has a stopper projection projecting toward the holding plate;

the holding plate has a guide groove configured to engage with the stopper projection to hold the stopper at a predetermined position in a radial direction of the stopper support;

the guide groove has a first regulation wall with which the stopper engages at a predetermined position in the radial direction, and a second regulation wall with which the stopper engages at a position where the stopper projects to the outer diameter side from the predetermined position in the radial direction; and the first regulation wall is formed of an arc coaxially with the bearing hole.

15. The hoisting machine according to claim 14, wherein the holding plate is formed with a play gap groove along a circumferential direction, and the stopper projection is movable along the play gap groove;

the first regulation wall is a wall surface on an outer diameter side of the play gap groove.

16. The hoisting machine according to claim 11, wherein the stopper support has a stopper housing in a concave shape which houses the stopper, and the stopper is housed in the stopper housing when the stopper does not project to the outer diameter side;

an arc bottom surface in an arc shape is on a deep side of the stopper housing being a shaft-shaped member side; and an arc surface with an arc-shaped side surface of the stopper engaging with the stopper housing is on the shaft-shaped member side.

17. The hoisting machine according to claim 11, wherein:

when the shaft-shaped member rotates with acceleration toward the first rotation direction, the holder relatively rotates in a direction opposite to the first rotation with respect to the shaft-shaped member against an urging force of the urger; and the holder holds the stopper at the predetermined position in the radial direction until an angle of the relative rotation exceeds a predetermined angle.

18. The hoisting machine according to claim 11, wherein the hoisting machine is a lever hoist and comprises:

a load sheave which is pivotally supported by a pair of the frames and around which a chain configured to hoist a cargo is wound;

a drive shaft coupled to the load sheave via a reduction gear and corresponding to the shaft-shaped member; and an operation lever configured to perform a rotation drive operation on the load sheave in the hoisting direction and the lowering direction.

* * * * *